United States Patent
Kang et al.

(10) Patent No.: US 9,191,942 B2
(45) Date of Patent: Nov. 17, 2015

(54) METHOD AND DEVICE FOR ALLOCATING GROUP RESOURCES FOR M2M DEVICE IN WIRELESS COMMUNICATION SYSTEM

(75) Inventors: Seunghyun Kang, Anyang-si (KR); Kiseon Ryu, Anyang-si (KR); Hangyu Cho, Anyang-si (KR); Jinsoo Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 14/003,437

(22) PCT Filed: Mar. 9, 2012

(86) PCT No.: PCT/KR2012/001742
§ 371 (c)(1),
(2), (4) Date: Sep. 5, 2013

(87) PCT Pub. No.: WO2012/121566
PCT Pub. Date: Sep. 13, 2012

(65) Prior Publication Data
US 2013/0343323 A1    Dec. 26, 2013

Related U.S. Application Data

(60) Provisional application No. 61/451,073, filed on Mar. 9, 2011.

(51) Int. Cl.
*H04Q 9/00* (2006.01)
*H04W 72/04* (2009.01)
(Continued)

(52) U.S. Cl.
CPC ............ *H04W 72/042* (2013.01); *H04W 4/005* (2013.01); *H04W 72/04* (2013.01); *H04W 8/186* (2013.01); *H04W 48/16* (2013.01); *H04W 84/18* (2013.01); *H04W 92/18* (2013.01)

(58) Field of Classification Search
CPC ............................ H04W 4/005; H04B 7/2656
USPC ..................... 370/329, 437; 455/500
See application file for complete search history.

(56) References Cited

U.S. PATENT DOCUMENTS

2009/0191857 A1* 7/2009 Horn et al. ............... 455/419
2011/0053619 A1* 3/2011 Shaheen et al. ......... 455/466
(Continued)

OTHER PUBLICATIONS

PCT International Application No. PCT/KR2012/001742 Written Opinion of the International Searching Authority dated Oct. 4, 2012, 19 pages.

(Continued)

*Primary Examiner* — Wanda Z Russell
(74) *Attorney, Agent, or Firm* — Lee, Hong, Degerman, Kang & Waimey

(57) ABSTRACT

The present invention relates to wireless communication, and more specifically, to a method and a device for allocating group resources for a M2M device to which machine to machine (M2M) communication is applied in a wireless communication system. A method for allowing a machine to machine (M2M) device to be allocated with resources with resources in a wireless communication system comprises the steps of: receiving first information for identifying said M2M device from a base station; receiving, from said base station, group resource allocations, second information for identifying a first group to which said M2M device belongs, and third information for identifying said M2M device within said first group; and determining first group resource allocations corresponding to said second information from said group resource allocations, without using said first information, and then transmitting first data by using resource allocations corresponding to said third information from said first group resource allocations.

18 Claims, 10 Drawing Sheets

(51) Int. Cl.
*H04W 4/00* (2009.01)
*H04W 8/18* (2009.01)
*H04W 48/16* (2009.01)
*H04W 84/18* (2009.01)
*H04W 92/18* (2009.01)

(56) References Cited

U.S. PATENT DOCUMENTS

2012/0051305 A1* 3/2012 Wang et al. ............... 370/329
2012/0115518 A1* 5/2012 Zeira et al. ............... 455/500
2012/0142268 A1* 6/2012 Tao et al. ............... 455/3.05
2012/0307798 A1* 12/2012 Zhou et al. ............... 370/331
2013/0265984 A1* 10/2013 Li et al. ............... 370/330

OTHER PUBLICATIONS

R. Y. Kim, "Snoop based group communication scheme in cellular machine-to-machine communications," 2010 International conference on information and communication technology convergence (ICTC), pp. 380-381, Nov. 19, 2010.

* cited by examiner

FIG. 1
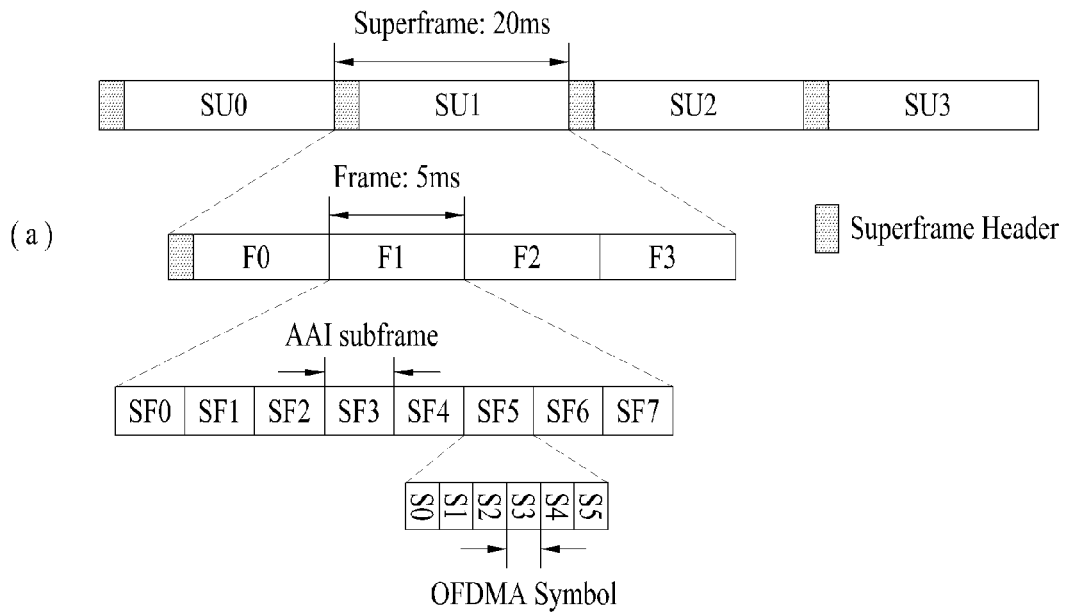
(a)
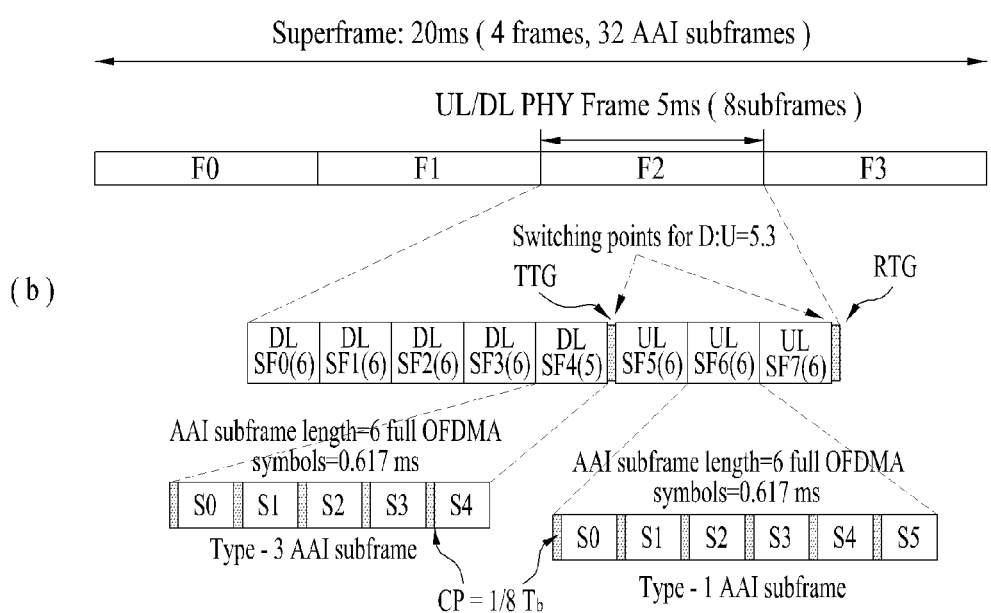
(b)

METHOD AND DEVICE FOR ALLOCATING GROUP RESOURCES FOR M2M DEVICE IN WIRELESS COMMUNICATION SYSTEM

CROSS-REFERENCE TO RELATED APPLICATIONS

This application is the National Stage filing under 35 U.S.C. 371 of International Application No. PCT/KR2012/001742, filed on Mar. 9, 2012, which claims the benefit of U.S. Provisional Application Ser. No. 61/451,073, filed on Mar. 9, 2011, the contents of which are all hereby incorporated by reference herein in their entirety.

FIELD OF THE INVENTION

The present invention relates to wireless communication and, more particularly, a method and device for allocating group resources for a M2M device to which machine to machine (hereinafter referred to as M2M) is applied in a wireless communication system.

BACKGROUND ART

The conventional communication mostly corresponds to Human to Human (hereinafter referred to as H2H) communication, wherein the communication is performed between user equipments used by users by passing through a base station. With the evolution in the technology, Machine to Machine (hereinafter referred to as M2M) communication has become possible. M2M communication literally refers to a communication between an electronic device (or machine) and another electronic device (or machine). As a broader definition, M2M refers to a wireless or wired communication between electronic devices, or to a communication between a user-controlled device and a machine. However, recently, M2M has generally been defined as a wireless communication between an electronic device and another electronic device.

When the concept of M2M communication was first adopted in the early 1990's, M2M communication was merely understood and recognized as the concept of remotely controlled communication or telematics, and the related market was also limited to such concept. However, over the past few years, M2M communication has been under development at a remarkable rate and has now evolved to a market drawing national and worldwide attention. Most particularly, the M2M communication has greatly influenced diverse fields including Fleet Management, remote monitoring of devices and equipments, smart meter for measuring the operation time of a construction equipment installation and for automatically measuring the usage amount of heat or electricity in an applied market related to the Point of Sales (POS) and security. The M2M communication that is to be used in the future is expected to be used and applied for a wider scope of usage in association with the conventional mobile communication and high speed wireless internet or low power communication solutions, such as Wi-Fi and Zigbee, thereby becoming the basis for expanding its market domain to the B2C market, and not being limited only to the B2B market.

In the age of M2M communication, all types of machines (or devices) equipped with a SIM (Subscriber Identity Module) card may perform data reception and transmission, thereby being capable of being remotely controlled and managed. For example, being applied to an extended range of devices and equipments, such as cars, trucks, trains, containers, vending machines, gas tanks, and so on, the M2M communication technology may be applied to an enormous range of application.

As the application types of the M2M device continuously increasing, a considerable number of such M2M devices will exist within the same base station. When the remarkably increased number of M2M devices, which are maintained in an idle mode, attempt to perform network re-entry, access collision and access complexity may occur frequently, and the communication performance may be degraded.

Meanwhile, by performing group paging, M2M devices belonging to the same subscriber may wake at the same time and may then attempt Ranging. At this point, the likelihood of the M2M devices, which belong to the same subscriber, transmitting the same data traffic becomes greater. Therefore, with respect to the M2M devices belonging to the same subscriber, a method for allocating resources in group units is being required.

DETAILED DESCRIPTION OF THE INVENTION

Technical Objects

The present invention provides a method and device for allocating group resources for a M2M device having Machine to Machine (hereinafter referred to as M2M) communication applied thereto in a wireless communication system.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the technical object of the present invention, a method for allocating resources at a M2M (Machine to Machine) device in a wireless communication system is disclosed, the method may comprise receiving first information for identifying the M2M device from a base station, receiving from the base station group resource allocation, second information for identifying a first group to which the M2M device belongs, and third information for identifying the M2M device within the first group, and deciding a first group resource allocation corresponding to the second information among the group resource allocation without using the first information, and transmitting first data by using resource allocation corresponding to the third information among the first group resource allocation.

Additionally, the first information may correspond to a STID (Station Identifier), the second information may correspond to a group ID (Group Identifier), and the third information may correspond to a user bitmap index.

Additionally, the M2M device may correspond to a fixed device having no mobility.

Moreover, the method may further comprise entering an idle mode after transmitting the first data, and, when a paging group message is received from the base station, transmitting a MAC (Media Access Control) address used in a previous network entry to the base station.

Also, the method may further comprise receiving the second information from the base station, and transmitting second data to the base station by using resource allocation corresponding to the third information.

Also, the method may further comprise the step of transmitting bandwidth request (BR) information to the base station, wherein the bandwidth request information may include the second information and the third information.

Meanwhile, in order to achieve the technical objects of the present invention, a method for allocating resources at a base station in a wireless communication system, the method may comprise transmitting first information for identifying a M2M device to the M2M device, and transmitting group resource allocation, second information for identifying a first group to which the M2M device belongs, and third information for identifying the M2M device within the first group to the M2M device, wherein the M2M device may be allocated with the resources by using the second information and the third information and without using the first information.

Additionally, the first information may correspond to a STID (Station Identifier), the second information may correspond to a group ID (Group Identifier), and the third information may correspond to a user bitmap index.

Moreover, the method may further comprise transmitting a paging group message to the M2M device, receiving a MAC address used in a previous network entry from the M2M device, and determining whether or not the M2M device belongs to the first group by using the received MAC (Media Access Control) address.

Also, when the M2M device belongs to the first group, the method may further comprise transmitting the second information to the M2M device.

Meanwhile, in order to achieve the technical objects of the present invention, a M2M (Machine to Machine) device being allocated with resources in a wireless communication system, the M2M device may comprise a receiving module configured to receive first information for identifying the M2M device from a base station, and receive from the base station group resource allocation, second information for identifying a first group to which the M2M device belongs, and third information for identifying the M2M device within the first group; a processor configured to decide a first group resource allocation corresponding to the second information among the group resource allocation without using the first information; and a transmitting module configured to transmit first data by using resource allocation corresponding to the third information among the first group resource allocation according to control of the processor.

Additionally, the first information may correspond to a STID (Station Identifier), the second information may correspond to a group ID (Group Identifier), and the third information may correspond to a user bitmap index.

Also, the M2M device may correspond to a fixed device having no mobility.

Additionally, the processor may control the M2M device such that the M2M device enters an idle mode when the first data are transmitted, wherein when a Paging Group message is received from the base station, the processor may control the M2M device such that a MAC (Media Access Control) address used in a previous network entry is transmitted to the base station.

Moreover, when the receiving module receives the second information from the base station, the processor may control the M2M device such that second data is transmitted to the base station by using resource allocation corresponding to the third information.

Also, the processor may control the M2M device such that bandwidth request (BR) information is transmitted to the base station, wherein the bandwidth request information may include the second information and the third information.

Meanwhile, in order to achieve the technical objects of the present invention, a base station allocating resources in a wireless communication system, the base station may comprise a processor, and a transmitting module configured to transmit first information for identifying a M2M device to the M2M device, and transmit group resource allocation, second information for identifying a first group to which the M2M device belongs, and third information for identifying the M2M device within the first group to the M2M device according to control of the processor, wherein the M2M device are allocated with the resources by using the second information and the third information and without using the first information.

Additionally, the first information may correspond to a STID (Station Identifier), the second information may correspond to a group ID (Group Identifier), and the third information may correspond to a User Bitmap Index.

Additionally, the transmitting module may transmit a paging group message to the M2M device according to control of the processor, and the base station may further comprise a receiving module configured to receive a MAC address used in a previous network entry from the M2M device, and the processor may determine whether or not the M2M device belongs to the first group by using the received MAC (Media Access Control) address.

Furthermore, when the M2M device belongs to the first group, the processor may transmit the second information to the M2M device.

Effects of the Invention

According to the exemplary embodiment of the present invention, by being allocated with resources in group units, the M2M device may perform faster (or swifter) and more efficient communication.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

FIG. 1 illustrates a super frame in an IEEE 802.16m system, which corresponds to an example of the wireless communication system.

MODE FOR CARRYING OUT THE PRESENT INVENTION

Figure 2:
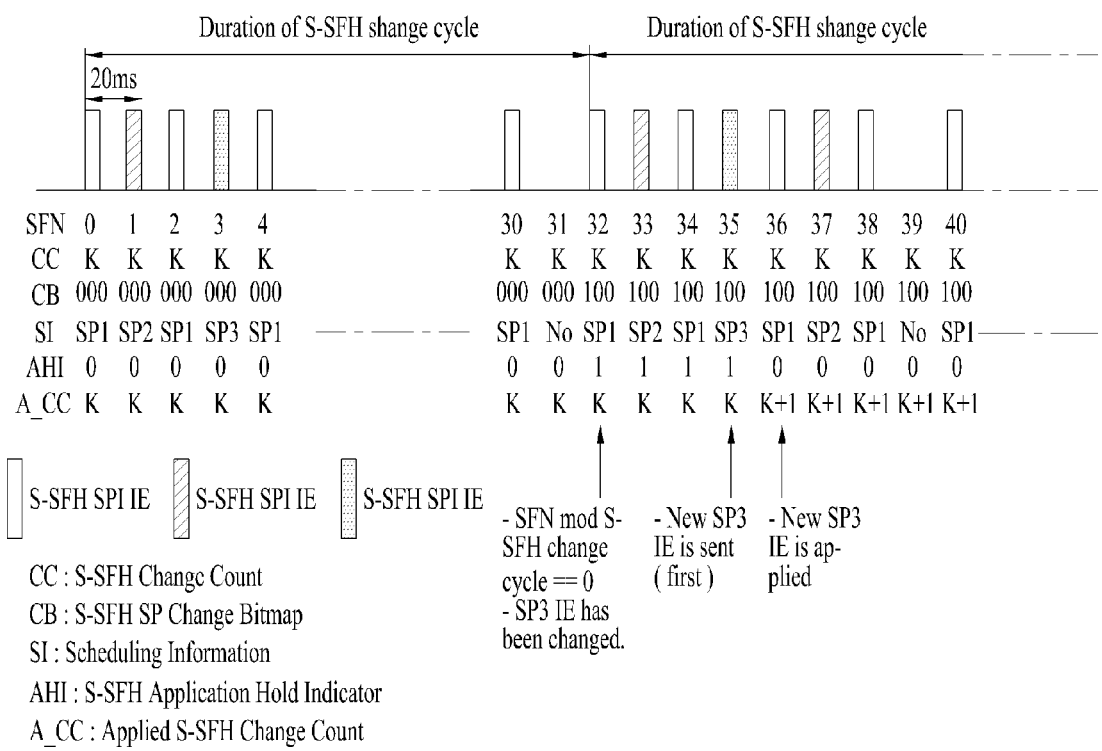
FIG. 2 illustrates a drawing for describing an update of an S-SFH IE in the IEEE 802.16m system, which corresponds to an example of the wireless communication system.

Hereinafter, the preferred embodiments of the present invention will now be described in detail with reference to the accompanying drawings. The detailed description of the present invention that is to be disclosed along with the appended drawings is merely given to describe the exemplary embodiment of the present invention. In other words, the embodiments presented in this specification do not correspond to the only embodiments that can be realized according to the present invention.

In the following description of the present invention, the description of detailed features of the present invention will be given in order to provide a full and complete understanding of the present invention. However, it will be apparent to those skilled in the art that the present invention can be realized even without the detailed features described herein. For example, although the following description is given based upon the assumption that the mobile communication system corresponds to a 3GPP2 802.16 system, with the exception for the unique features of the 3GPP2 802.16 system, the other features may also be applied to any other arbitrary mobile communication system.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it is assumed that the user terminal (or user equipment) universally refers to a mobile or fixed user-end device, such as a UE (User Equipment), a MS (Mobile Station), an AMS (Advanced Mobile Station), and so on. Additionally, it is also assumed that the base station universally refers to as an arbitrary node of a network end, which communicates with the user equipment, such as a Node B, an eNode B, a BS (Base Station), an ABS (Advanced Base Station), and so on. In the following description, it will be assumed that the user equipment corresponds to a user equipment (AMS: Advanced Mobile Station) satisfying the IEEE 802.16m standard, and it will also be assumed that the base station (ABS: Advanced Base Station) satisfying the same standard.

In the wireless communication system, the UE (User Equipment) may receive information by downlink, and the UE may transmit information by uplink. The information transmitted or received by the user equipment may correspond to data and diverse control information, and, depending upon the type/purpose of the information being transmitted or received by the user equipment, diverse physical channels exist.

As described above, the user equipment, which communicates by using the M2M method, may be diversely referred to as a M2M device, a M2M communication device, a MTC (Machine Type Communication) device, and so on. And, the conventional user equipment may be referred to as a HTC (Human Type Communication) device, and a H2H (Human to Human) device.

As the Machine Application Type is being increased, the M2M device may gradually increase its number within a consistent network. Herein, the Machine Application Types that are being discussed may include (1) security, (2) public safety, (3) tracking and tracing, (4) payment, (5) healthcare, (6) remote maintenance and control, (7) metering, (8) consumer device, (9) Fleet Management in an application market related to POS (Point of Sales) and security, (10) communication between devices in Vending Machines, (11) remote monitoring of machines and equipments, (12) Surveillance Video communication of surveillance cameras, and so on. However, the Machine Application types are not required to be limited only to the above-mentioned types. And, therefore, other variety of machine application types may also be applied herein. As described above, in accordance with the increase in the user equipment application type, the number of M2M devices may be increased at a remarkable rate as compared to the number of the conventional user equipments, i.e., H2H devices.

As described above, the considerable number of M2M devices included in the same base station may cause access complexity within the conventional user equipments, i.e., H2H devices, and may also cause access collision between the M2M devices. Therefore, discussions on a method of minimizing the influence of the conventional user equipments (H2H devices) and a method of efficiently distributing the limited amount of resource to the plurality of M2M devices, which are newly introduced, are required to be made.

More specifically, in the wireless communication system, if a network re-entry procedure from an idle mode of the user equipment, which is applied to the conventional user equipment, i.e., H2H device), is directly applied to the multiple M2M devices, the problem of access complexity may occur. And, therefore, the network re-entry procedure is required to be partially corrected.

FIG. 1 illustrates a super frame in an IEEE 802.16m system, which corresponds to an example of the wireless communication system.

Referring to FIG. 1, a Superframe has a length of 20 ms and is configured of 4 frames. One frame may then be configured of 8 Advanced Air Interface (AAI) subframes. And, in case of a TDD, the 8 AAI subframes may be divided into a downlink subframe region (or area or zone) and an uplink subframe region (or area or zone) each including a predetermined number of orthogonal frequency division multiple access (OFDMA) subframes depending upon a ratio between the downlink (DL) and the uplink (UL) (or DL/UL ratio). More specifically, as shown in FIG. 1(*b*), in case the uplink/downlink (UL/DL) ratio corresponds to 5:3, among the 8 subframes, 5 subframes (SF0 to SF4) are allocated as downlink subframes, and the remaining 3 subframes (SF5 to SF7) are allocated as the uplink subframes.

An idle time, to which a data symbol including data (i.e., idle symbol) is not allocated, i.e., a TTG (Transmit/receive Transition Gap) exists between the downlink subframe region and the uplink subframe region. Additionally, an idle time, i.e., an RTG (Receive/transmit Transition Gap) may also exist after the downlink subframe region. Furthermore, one subframe is then configured of 6 OFDM symbols.

By using the above-described frame structure, the base station and the use equipment may perform data exchange. For example, the user equipment may receive data from the base station through the downlink subframes, and the user equipment may transmit data to the base station through the uplink subframes. Additionally, the base station may transmit data to the user equipment through the downlink subframes, and the base station may receive data from the user equipment through the uplink subframes.

In the above-described frame structure, a SuperFrame Header (SFH) may be transmitted to the user equipment through the super frame. The SuperFrame Header may include frame unit or subframe unit resource allocation information or system information, and so on, which are included in the superframe header. The SFH may be located in a first subframe within the superframe, and five OFDM symbols may be used in the subframe.

The SFH may be divided into a Primary Superframe Header (P-SFH) and a Secondary Superframe Header (S-SFH). The P-SFH may be transmitted at a cycle of one superframe, and the P-SFH may include system information that should be transmitted at each superframe. The P-SFH may include an S-SFH change count, an S-SFH scheduling information, S-SFH change bitmap, an S-SFH application hold indicator, and so on.

The S-SFH change count may indicate whether or not the value of each field within the S-SFH SP IE is being changed (updated). More specifically, when the value of a particular field within the S-SFH SP IE is changed (or updated), the S-SFH change count may be incremented (1 modulo 16), however, the increment may be applied from the next (or following) S-SFH change cycle. The incremented S-SFH change count is maintained until its next (or following) S-SFH change cycle. If the value of the S-SFH change count field of the next P-SFH IE is identical to the value stored in the user equipment, the user equipment may determine that no change has occurred in the S-SFH IE and may then disregard (or ignore) the S-SFH IEs.

The S-SFH change bitmap may indicate which S-SFH SP IE has been changed. Each bit of the S-SFH change bitmap may respectively indicate S-SFH SP1 IE, S-SFH SP2 IE, S-SFH SP3 IE, and a changed S-SFH SP IE may be indicated (or marked) as 1, and an unchanged S-SFH SP IE may be indicated (or marked) as 0. For example, in case S-SFH SP3 IE is changed, the S-SFH change bitmap may be indicated (or expressed) as 100.

The S-SFH application hold indicator may indicate a time point at which the explicitly changed S-SFH SP IE is to be applied. If the field value is equal to 0, the user equipment may use an S-SFH SP IE, which is associated with the current S-SFH change count, and, of the field value is equal to 1, the user equipment may use an S-SFH SP IE, which is associated with the previous S-SFH change count.

The S-SFH IE (secondary super frame header information element) includes information associated with network entry/re-entry and so on, and the S-SFH IE may be divided into three SubPackets (SPs). Such subpackets may each be transmitted at different intervals (or periods), and information related to such intervals may be included in the S-SFH SP3 as SP scheduling periodicity information. S-SFH SP1 IE includes information for network reentry, S-SFH SP2 IE includes information for initial network entry and network discovery, and S-SFH SP3 IE includes the remaining essential system information for network (re-)entry.

FIG. 2 illustrates a drawing for describing an update of an S-SFH IE in the IEEE 802.16m system, which corresponds to an example of the wireless communication system. More specifically, this corresponds to a case when a change has occurred in the information included in the S-SFH SP3 IE.

Referring to FIG. 2, it is provided that the S-SFH change cycle corresponds to 32, and it is apparent that a specific S-SFH SP IE is transmitted for each Super Frame Number (SFN). For example, in case the base station changes the information related to network re-entry, which is included in the S-SFH SP3 IE of SFN 30, the CC (S-SFH change count) is incremented by 1 starting from SFH 32, from which the next S-SFH change cycle begins. Moreover, in order to indicate that the changed S-SFH IE corresponds to S-SFH SP3 IE, the CB (S-SFH change bitmap) is changed from 000 to 100.

The user equipment receives a P-SFH IE, so as to verify the S-SFH change count field, and, herein, the user equipment may determine that the CC (S-SFH change count) has been incremented by 1 starting from K, which is stored in the user equipment itself, in SFN 32, i.e., that a change has occurred in the S-SFH SP IE. Moreover, the user equipment may also determine from the CB (S-SFH change bitmap) that a change has occurred in the S-SFH SP3 IE and then waits for the S-SFH SP3 IE. After initially receiving the S-SFH SP3 IE, which is changed in SFN 35, the user equipment decodes the received S-SFH SP3 IE, so as to use the network re-entry information, which is changed from SFN 36. If the changed S-SFH IE corresponds to S-SFH SP1 IE or S-SFH SP2 IE, the change is applied starting from the changed S-SFH IE, which is subsequently transmitted (or transmitted after the first S-SFH IE).

As described above, by referring to the S-SFH change count, the S-SFH change bitmap, the S-SFH application hold indicator, and so on, the base station may be capable of determining which S-SFH SP IE of the current super frame is to be decoded in order to update the system parameter, which is included in the S-SFH SP IE.

Meanwhile, an AAI-SCD message is used by the base station for transmitting information related to system set-up (or system configuration), and the AAI-SCD message is periodically transmitted. When a change occurs in the content of the AAI-SCD message, the value of a Configuration Change Count field is incremented by (1 modulo 16).

By using an SCD count field of the S-SFH SP3 IE, the base station may be capable of indicating when the changed AAI-SCD message is to be applied. After transmitting the S-SFH SP3 IE including an SCD count, which is identical to the configuration change count within the AAI-SCD, the changed system configuration is applied.

Meanwhile, the user equipment receives system configuration information of the AAI-SCD message, which is related to the current SCD count. If the change in the AAI-SCD message results from the update of the S-SFH SP3 IE, a new AAI-SCD message is transmitted before the changed S-SFH SP. After receiving the changed S-SFH SP3, the user equipment may use the system configuration of the AAI-SCD message, which is associated with the current SCD count.

Figure 3:
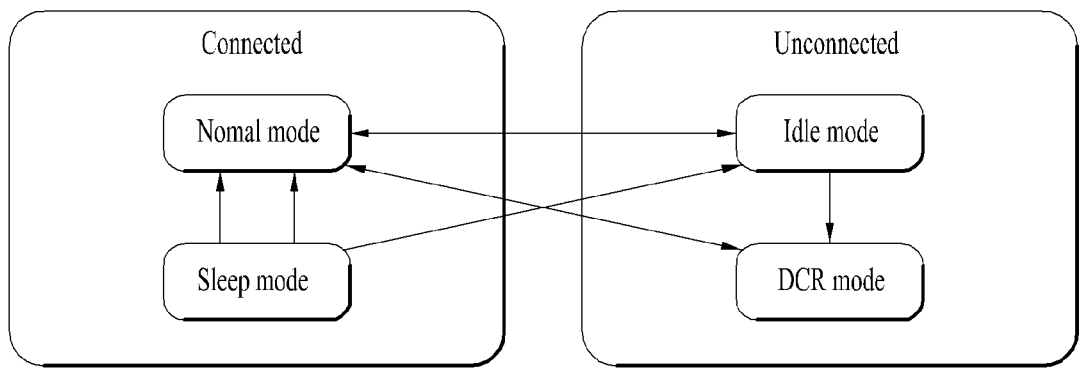
FIG. 3 illustrates a status diagram of a user equipment in the IEEE 802.16m system, which corresponds to an example of the wireless communication system.

FIG. 3 illustrates a status diagram of a user equipment in the IEEE 802.16m system, which corresponds to an example of the wireless communication system.

Referring to FIG. 3, the status of the user equipment may be divided into a connected state and an unconnected state. The connected state may then be divided into a normal mode or a sleep mode. Additionally, the unconnected state may be divided into an idle mode or a DCR (Deregistration with Context Retention). Such sleep mode and idle mode are defined in order to efficiently use the consumed power of all user equipments.

First of all, the sleep mode corresponds to an operation mode of managing a sleep mode pattern, which is configured of a sleep-window and a listening-window, which is authorized by the base station through the transmission and reception of AAI-SLP-REQ/AAI-SLP-RSP messages between the user equipment and the base station, for the Power saving of the user equipment. The idle mode corresponds to an operation mode of managing a Paging Group, a Paging Cycle, and a Paging Offset, which are authorized by the base station through the transmission and reception of AAI-DREG-REQ/AAI-DREG-RSP messages between the user equipment and the base station, for the Power saving and wireless resource (or radio resource) saving of the user equipment.

The Normal mode corresponds to an operation mode performed by the user equipment for executing a service, which is provided by the corresponding system, by using radio resources. The DCR mode corresponds to an operation mode, wherein the user equipment is deregistered from the network. However, the context of the deregistered user equipment is preserved for a predetermined period of time.

The basic operations of the sleep mode will hereinafter be described in detail. In the normal mode, in case traffic does not occur with respect to a downlink or an uplink for a predetermined period of time, the user equipment transmits an AAI-SLP-REQ message to the base station in order to request the base station for a shift to the sleep mode. When the operation request for shifting to the sleep mode is received through the AAI-SLP-REQ, the base station transmits a final approval (or authorization) through an AAI-SLP-RSP message, and, then, upon receiving the AAI-SLP-RSP message, the user equipment is then allocated with an ID (SLPID) in order to allow the corresponding user equipment to be identified as the user equipment operating in the sleep mode, thereby being operated in the sleep mode.

Herein, the main parameters that are gained by transmitting and receiving messages to and from the user equipment and the base station correspond to an initial sleep-window, which designates the size of an initial sleep window interval (or section), a final sleep-window base, which designates the size of a final sleep-window, and a listening-window setting up a final sleep-window exponent and the size of a listening window interval (or section), and the unit of all parameters corresponds to a frame. The sleep window corresponds to a section that allows the user equipment, which is being operated in the sleep mode, to minimize the amount of power it consumes, and, herein, the user equipment does not receive any downlink control information and downlink traffic during the sleep-window section. Additionally, the listening window corresponds to a section that allows the user equipment, which operates in the sleep mode, to disengage from the sleep-window so as to receive an AAI-TRF-IND message, and that determines whether or not any downlink traffic being transmitted to the user equipment exists, and, herein, the user equipment may receive downlink control information and downlink traffic during the sleep-window section.

Hereinafter, the basic operations of the idle mode will be described in detail. In the normal mode, in case traffic does not occur with respect to a downlink or an uplink for a predetermined period of time, the user equipment transmits an AAI-DREG-REQ message to the base station in order to request the base station for a shift to the idle mode, and, then, after receiving an AAI-DREG-CMD message from the base station, the user equipment is operated in the idle mode. A paging cycle requested by the user equipment is defined in the AAI-DREG-REQ message, and a paging group ID, a paging offset, and a paging cycle are defined in the DREG-CMD message that is transmitted from the base station, which has received the AAI-DREG-REQ message. By using the parameters, the user equipment sets up a Paging Unavailable Interval and a Paging Listening Interval.

The user equipment minimizes the power during the Paging Unavailable Interval and receives an AAI-PAG-ADV message, which is transmitted from the base station, during the Paging Listening Interval. The AAI-PAG-ADV message consists of a paging group ID of a paging group to which the base station transmitting the corresponding message belongs, MAC address hash information indicating user equipments that require Location Update or network entry/re-entry, among the user equipments operating in the idle mode, and an Action code describing the procedures that are to be performed by each user equipment.

If traffic designated to a user equipment operating in the idle mode occurs, the base station transmits the AAI-PAG-ADV message to a next paging listening interval, and, after receiving the AAI-PAG-ADV message, the user equipment may disengage from the idle mode and enter the normal mode.

Meanwhile, when performing procedures, such as network re-entry and network entry from the idle mode, a procedure of controlling transmission parameters (frequency offset, time offset, and transmission power) for performing uplink communication with the base station is referred to as ranging.

Ranging includes 4 different modes, such as initial ranging, handover ranging, periodic ranging, and Bandwidth request ranging.

Initial ranging refers to a process performed by the user equipment, during the process of performing the initial network entry procedure, of controlling (or adjusting) transmission parameters (frequency offset, time offset, transmission power) for enabling the user equipment to perform uplink communication with the base station. Handover ranging refers to a process of simplifying procedures during handover operation. Periodic ranging refers to a process performed by the user equipment, after performing the network entry procedure, for persistently (or continuously) maintaining the uplink communication with the base station. Bandwidth request ranging refers to a process performed by the user equipment during a process of requesting for an uplink band when traffic that is to be transmitted to the base station occurs.

In the wireless communication system, a ranging code (or ranging preamble), which may be used when ranging is performed in accordance with the ranging type, and an area (or region) (ranging channel) that is to transmit the ranging code are allocated through a channel (e.g., Broadcast Assignment A-MAP IE) broadcasting system information via network. For example, in order to allow the user equipment to perform handover ranging, among the ranging codes for handover ranging, the user equipment selects a specific ranging code, and by transmitting the selected code to the network through a handover ranging channel, the user equipment requests ranging. The network may identify (or differentiate) the ranging types based upon the received ranging code and the channel through which the ranging code has been transmitted.

In the IEEE 802.16m system, a Ranging channel may be differentiated as a synchronized ranging channel (S-RCH) for a ranging process performed by a synchronized user equipment and a non-synchronized ranging channel (NS-RCH) for a ranging process performed by a non-synchronized user equipment. Additionally, in the IEEE 802.16m system, when data that are to be transmitted by the user equipment are generated, a Bandwidth request channel requesting for an uplink band exists. Such ranging channel (S-RCH, NS-RCH) and band request channel (BRCH) are respectively used in the Medium Access Control (MAC) layer a ranging opportunity and a bandwidth request opportunity.

Meanwhile, a method for transmitting the ranging code and the allocation information of the ranging channel and the corresponding ranging channel are differentiated in accordance with the format (or structure) of the base station.

For example, in case of base stations having a narrow coverage, such as a base station supporting wirelessMAN-OFDMA with FDM-based UL PUSC Zone and a Femto cell, the likelihood of the synchronization between the user equipment and the base station being unmatched is low, S-RCH may be used for performing initial ranging, handover ranging, and periodic ranging.

The ranging code and the allocation information of the ranging channel are essentially transmitted through a Superframe Header SFH (SP1: Ranging Parameter (RP) code partition information for the S-RCH, Allocation periodicity of the S-RCH, Subframe offset of the S-RCH, and so on).

In the other base stations excluding the above-described base station (e.g., Macro, Relay, Macro hot-zone), NS-RCH is used when performing initial ranging and handover ranging, and, when performing periodic ranging, since the user equipment is already synchronized, S-RCH is used.

The ranging code and the allocation information of the ranging channel are essentially transmitted through a Superframe Header SFH (SP1: Ranging Parameter (RP) code partition information for the NS-RCH, Allocation periodicity of the NS-RCH, Subframe offset of the NS-RCH, and so on). Moreover, apart from the SFH, the allocation information of the ranging channel may also be additionally delivered (or transmitted) through an A-MAP or AAI-SCD message. In case of the A-MAP, allocation information of the NS-RCH for the Handover ranging may be transmitted through a Broadcast Assignment A-MAP IE or AAI-HO-CMD from a subframe excluding the subframes, which are used for arbitrarily allocating general broadcast data in accordance with the scheduling decision of the base station. Furthermore, in case the AAI-SCD message is being used, information on the S-RCH allocation cycle, the number of ranging codes for the periodic ranging, and so on is included in the corresponding message.

Figure 4:
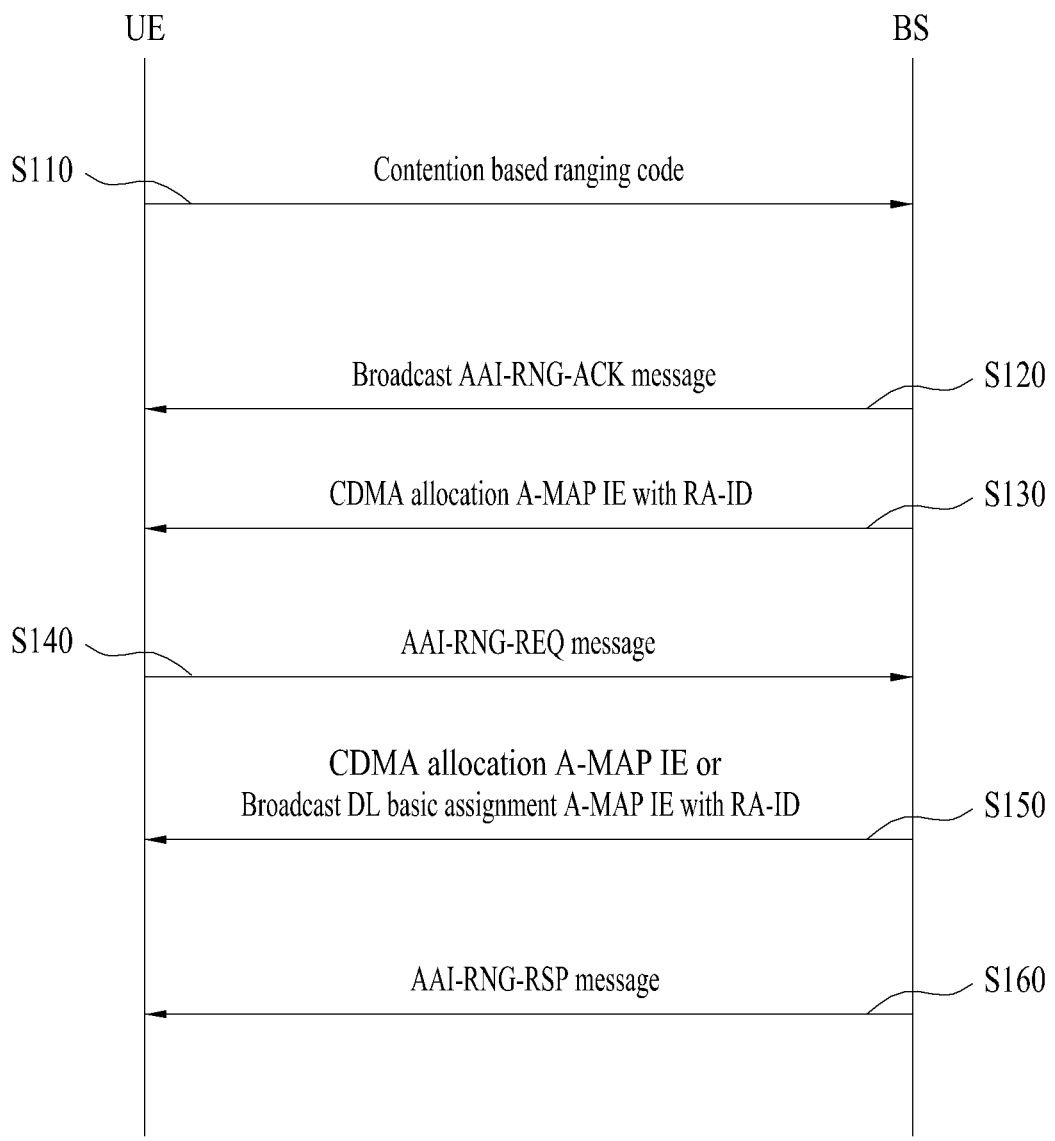
FIG. 4 illustrates a procedure of the user equipment for performing contention-based network re-entry in the IEEE 802.16m system, which corresponds to an example of the wireless communication system.

FIG. 4 illustrates a procedure of the user equipment for performing contention-based network re-entry in the IEEE 802.16m system, which corresponds to an example of the wireless communication system.

Referring to FIG. 4, the user equipment selects a ranging channel, and, after selecting a contention-based ranging code, the user equipment transmit the contention-based ranging code to the base station through the selected ranging channel (S110). When the base station successfully receives the corresponding ranging code, the base station transmits an AAI-RNG-ACK message to the user equipment by broadcast (S120). The AAI-RNG-ACK message corresponds to a message providing a response indicating that the ranging codes have successfully received and detected by the ranging channel. Additionally, the base station masks the CDMA allocation A-MAP IE, which corresponds to the uplink resource allocation information enabling the user equipment to transmit an AAI-RNG-REQ message, with a random access identifier (RA-ID), thereby transmitting the processed message (S130). The user equipment transmits an AAI-RNG-REQ message to the base station through the allocated uplink resource (S140), and the base station transmits downlink resource allocation information through which an AAI-RNG-RSP message is to be transmitted to the user equipment (S150). At this point, the downlink resource allocation information may be transmitted to the user equipment through the CDMA allocation A-MAP IE, which is masked with the RA-ID, or a Broadcast DL basic assignment A-MAP IE. Thereafter, the user equipment may receive the AAI-RNG-RSP message through the corresponding downlink resource (S160).

Figure 5:
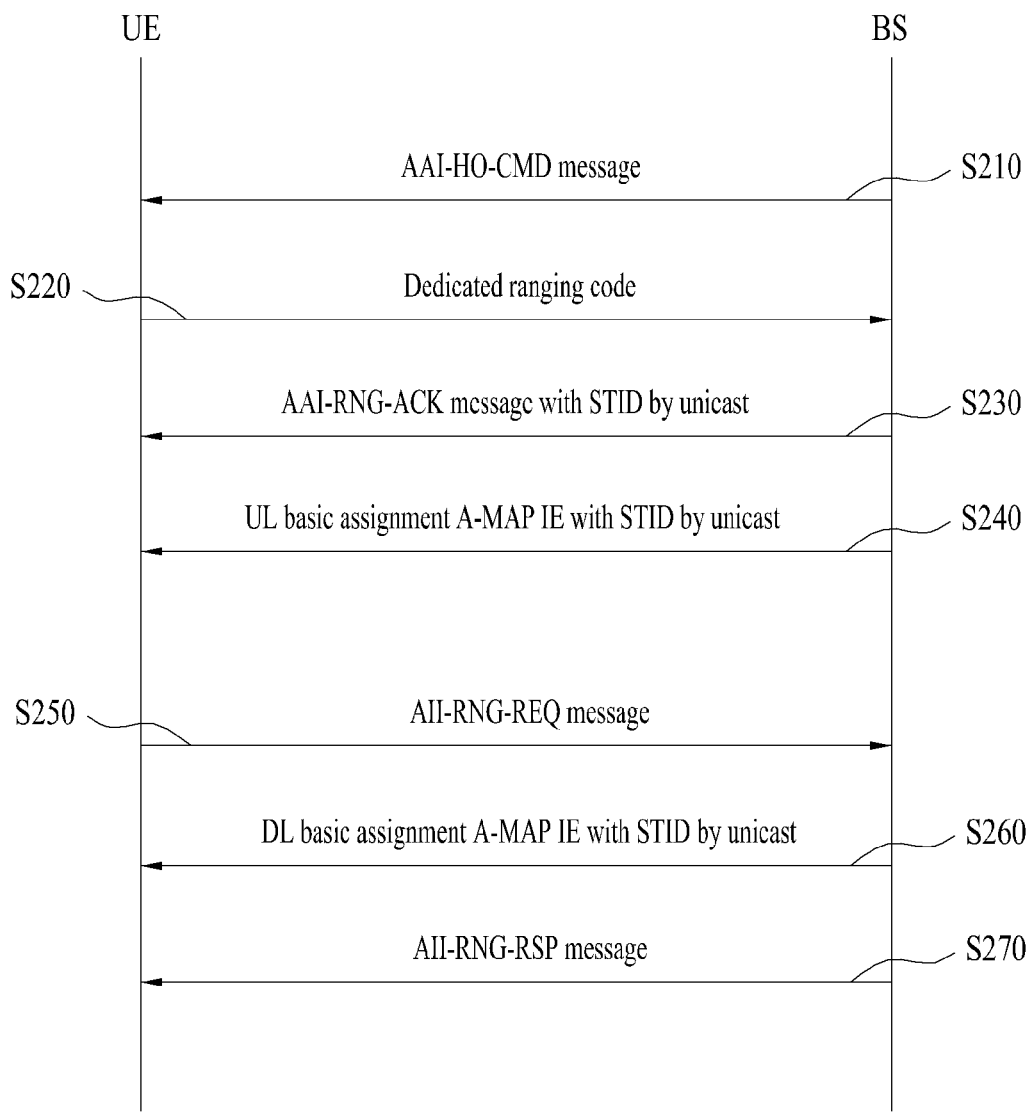
FIG. 5 illustrates a procedure of the user equipment for performing non-contention based (or contention-free) network re-entry in the IEEE 802.16m system, which corresponds to an example of the wireless communication system.

FIG. 5 illustrates a procedure of the user equipment for performing non-contention based (or contention-free) network re-entry in the IEEE 802.16m system, which corresponds to an example of the wireless communication system. This corresponds to an example of contention-free (or non-contention based) handover ranging.

Referring to FIG. 5, a serving base station transmits a dedicated ranging code to the user equipment through an AAI-HO CMD message (S210). The user equipment transmits the allocated dedicated ranging code to the base station (S220). A target base station notifies the user equipment that the corresponding dedicated ranging code has been successfully received through a station identifier (STID)-based AAI-RNG-ACK message by unicast (S230). After receiving the dedicated ranging code, the target base station is capable of determining which user equipment has transmitted corresponding dedicated ranging code. Moreover, in addition to the dedicated ranging code, a station identifier (STID), which is allocated in advance to the user equipment by the target base station, is also included in the AAI-HO-CMD message. In this case, since the corresponding user equipment has already acquired (or gained) the STID, the corresponding user equipment may not transmit an RA-ID based AAI-RNG-ACK message. The target base station transmits uplink resource allocation information, which enables the user equipment to transmit an AAI-RNG-REQ message, to the user equipment by unicast through a STID-based UL basic assignment A-MAP IE (S240). Then, by using the allocated uplink resource, the user equipment transmits the AAI-RNG-REQ message to the target base station (S250), and the base station transmits downlink resource allocation information, through which an AAI-RNG-RSP message is to be transmitted, through a STID-based DL basic assignment A-MAP IE (S260). Subsequently, the user equipment may receive the AAI-RNG-RSP message through the allocated downlink resource (S270).

Meanwhile, as described above, in case of ranging for a contention-free network re-entry, the base station may include a dedicated ranging code and a STID, which is allocated to the user equipment in advance, in the AAI-HO-CMD message and may then transmit the processed dedicated ranging code to the user equipment. However, since the ranging procedure is performed based upon a random access identifier (RA-ID), in case the M2M device performs contention-free ranging for a contention-free network re-entry, a problem occurs in differentiating the current ranging procedure from the other ranging procedures, which are based upon the conventional RA-ID.

First of all, according to a brief description of the RA-ID, the RA-ID is configured of a total of 15 bits and is defined in accordance with the random access characteristics of the corresponding user equipment. More specifically, the RA-ID consists of a 5-bit superframe number, a 2-bit frame_index, a 6-bit preamble code index for ranging, and a 2-bit opportunity index for ranging. Herein, a 6-bit preamble code index indicates a ranging code, and a 2-bit opportunity index indicates a ranging channel through which the ranging code is transmitted. More specifically, the opportunity index consists of '0b00' indicating a non-synchronized ranging channel (NS-RCH), '0b11' indicating a synchronized ranging channel (S-RCH), and '0b01/0b10' indicating a dynamic ranging channel. In other words, the 6-bit ranging code and the 2-bit ranging channel through which the ranging code is transmitted correspond to the essential elements for deciding (or determining) the RA-ID.

Figure 6:
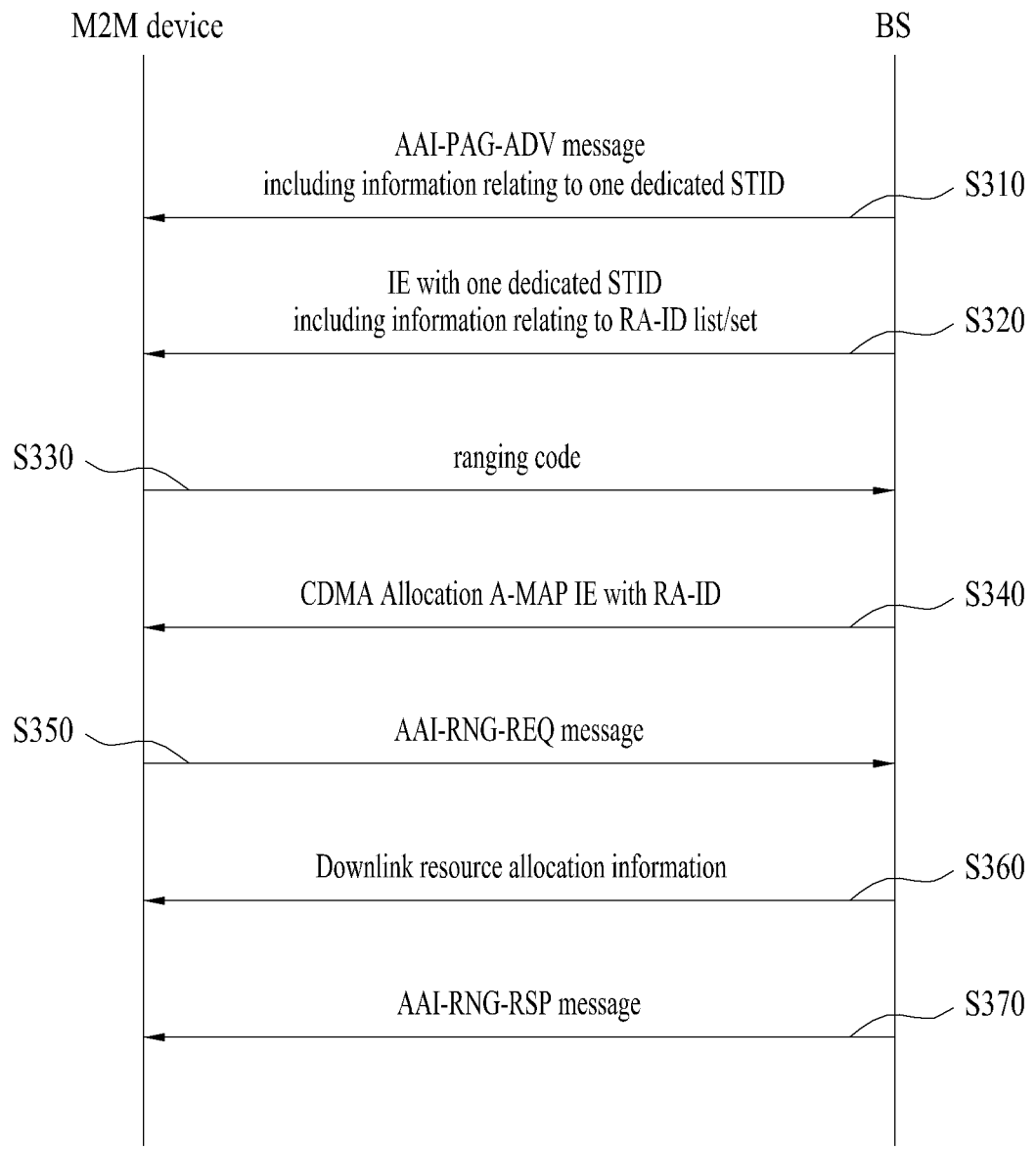
FIG. 6 illustrates a procedure of a M2M device for performing non-contention based (or contention-free) network re-entry according to an exemplary embodiment of the present invention.

FIG. 6 illustrates a procedure of a M2M device for performing non-contention based (or contention-free) network re-entry according to an exemplary embodiment of the present invention.

The base station may set up one dedicated identifier (e.g., one dedicated STID). The one dedicated STID of the base station corresponds to an ID, which can be used by one M2M device or collectively used by M2M devices performing contention-free network re-entry. The base station transmits an AAI-PAG-ADV message including the one dedicated STID, which is set up by the base station, by broadcast (S310).

The base station includes information related to an RA-ID list/set within a specific IE, which is masked by one dedicated STID, and transmits the processed IE to the one M2M device or M2M devices (S320). The information related to the RA-ID list/set may include a dedicated ranging code and information related to a ranging channel. The specific IE may correspond to a UL basic allocation A-MAP IE or a Broadcast A-MAP IE. Additionally, a new IE transmitting the information related to the RA-ID list/set may be defined. A CRC masking method respective to one dedicated STID will hereinafter be described in more detail with reference to Table 1 to Table 3 shown below.

The M2M device selects a ranging channel and then selects a ranging code, and, then, the M2M device transmits the ranging code to the base station through the selected ranging channel (S330). The base station performs CRC masking on a CDMA allocation A-MAP IE, which corresponds to uplink resource allocation information for allowing the M2M device to transmit an AAI-RNG-REQ message, with the RA-ID and transmits the processed IE (S340). The M2M device transmits the AAI-RNG-REQ message to the base station through the allocated uplink resource (S350), and, then, the base station transmits downlink resource allocation information, through which an AAI-RNG-RSP message is to be transmitted, to the M2M device (s360). Thereafter, the M2M device may receive the AAI-RNG-RSP message through the corresponding downlink resource (S370).

Meanwhile, in case the M2M devices target a specific paging group, one dedicated STID may be included in a field associated with a paging group ID within an AAI-PAG-ADV message and may then be transmitted. Additionally, when the corresponding M2M devices are included in one M2M group, an MGID (M2M group Identifier) may be used instead of one dedicated STID.

Table 1 to Table 3 shown below correspond to tables for describing a CRC Mask within the IEEE 802.16m system. The CRC consists of 1 bit of Masking prefix, 3 bits of a type indicator, and 12 bits of other elements.

TABLE 1

| Masking Prefix (1 bit MSB) | Remaining 15 bit LSBs | |
|---|---|---|
| 0b0 | Type Indicator | Masking Code |
| | 0b000 | 12 bit STID or TSTID |
| | 0b001 | Refer to Table 844 |
| | 0b010 | Refer to table 845 |

TABLE 1-continued

| Masking Prefix (1 bit MSB) | Remaining 15 bit LSBs |
|---|---|
| 0b1 | 15 bit RA-ID: The RA-ID is derived from the AMS's random access attributes (i.e., superframe number (LSB 5 bits), frame_index (2 bits), preamble code index for ranging or BR (6 bit) and opportunity index for ranging or BR (2 bits)) as defined below: RA-ID = (LSB 5 bits of superframe number\|frame_index\| preamble_code_index\|opportunity_index) |

Referring to Table 1, the Masking Prefix is assigned with 1 bit indicating '0b0' and '0b1', and, in case the Masking Prefix corresponds to '0b0', this indicates a masking code respective to the type indicator. The type indicator is defined only from '0b000', '0b001', and '0b010'. In case the type indicator corresponds to '0b000', this indicates 12 bits of STID or TSTID. And, in case the type indicator corresponds to 'ob001', reference should be made to Table 844, and, in case the type indicator corresponds to '0b010', reference should be made to Table 845. Table 844 and Table 845 sequentially correspond to each of Table 2 and Table 3 shown below.

TABLE 2

| Decimal Value | Description |
|---|---|
| 0 | Used to mask Broadcast Assignment A-MAP IE for broadcast or ranging channel assignment |
| 1 | Used to mask BR-ACK A-MAP IE |
| 2-128 | Used to mask Group resource Allocation A-MAP (group ID) |
| Others | Reserved |

TABLE 3

| Decimal Value | Description |
|---|---|
| 4095 | Used to mask Broadcast Assignment A-MAP IE for multicast assignment |
| Others | Reserved |

According to the CRC masking method of the dedicated STID according to the present invention, the STID definition, wherein the conventional Masking prefix is defined as '0b0', wherein the type indicator is defined as '0b000', and wherein the masking code is defined to be assigned with 12 bits, is used without modification. With respect to the values that are used for performing CRC masking on the Broadcast Assignment A-MAP IE, in order to perform M2M device dedicated ranging resource allocation, the Masking prefix may be defined as '0b0', the type indicator may be defined as '0b001', and the Decimal values may be defined as '129' or '4095'. Additionally, with respect to the values that are used for performing masking on the Broadcast Assignment A-MAP IE, in order to perform M2M device dedicated ranging resource allocation, the Masking prefix may be defined as '0b0', the type indicator may be defined as '0b010', and the Decimal values may be defined as '0' or '4094'. Meanwhile, a Function index 'ob11', which is included in the Broadcast Assignment A-MAP IE, may be defined as an index for M2M dedicated ranging resource allocation, and this field may be defined to include information related to RA-ID list/set. Moreover, even when the MGID is used instead of one dedicated STID, the above-described CRC masking method may be identically applied.

Figure 7:
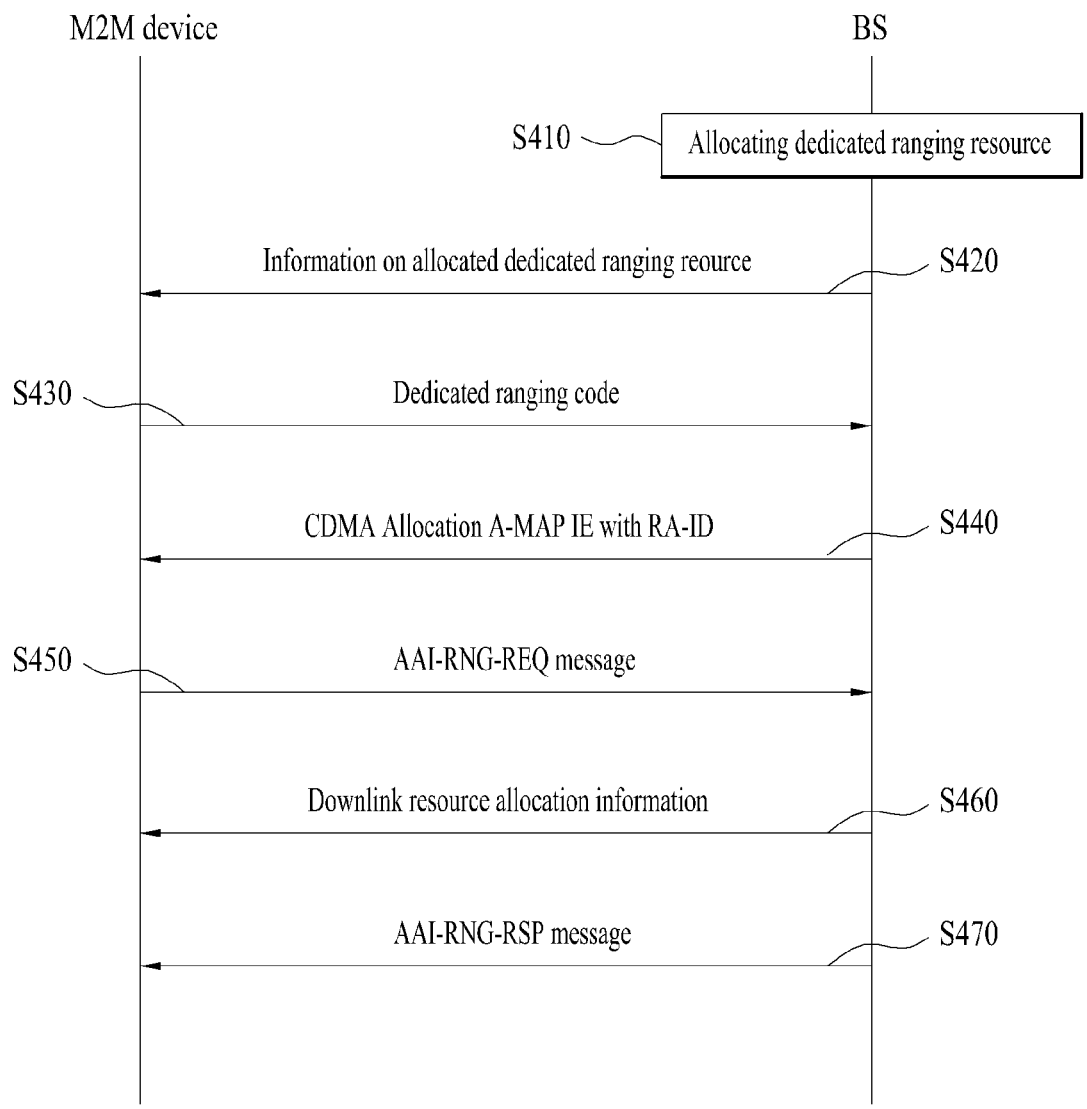
FIG. 7 illustrates a procedure of a M2M device for performing non-contention based (or contention-free) network re-entry according to an exemplary embodiment of the present invention.

FIG. 7 illustrates a procedure of a M2M device for performing non-contention based (or contention-free) network re-entry according to an exemplary embodiment of the present invention.

The base station may allocated a M2M device dedicated ranging code and a M2M device dedicated ranging resource including a ranging channel (ranging opportunity) (S410). In this case, the M2M device may use the dedicated ranging resource, so as to perform contention-free network re-entry.

The base station transmits information on the allocated M2M device dedicated ranging resource to the M2M device (S420). A method for transmitting the information on the allocated M2M device dedicated ranging resource will hereinafter be described in more detail. If the base station does not allocated the M2M device dedicated ranging resource, the M2M device may use a ranging resource, which is defined in an S-SFH SP1 IE, so as to perform a network re-entry procedure.

Subsequently, the M2M device performs ranging for the network re-entry by suing the allocated dedicated ranging resource. More specifically, the corresponding M2M device transmits the allocated dedicated ranging code to the base station through the allocated dedicated ranging channel (S430). The base station masks the CMDA Allocation A-MAP IE, which corresponds to the uplink resource allocation information allowing the M2M device to transmit an AAI-RNG-REQ message, with an RA-ID and, then, transmits the processed IE (S440).

At this point, the opportunity index within the RA-ID, which is masked with respect to the CDMA Allocation A-MAP IE, may be determined as any one of '0b01' and '0b10', unlike the conventional object and purpose. The determined opportunity index may be used as a type indicator indicating a M2M device dedicated ranging code or a ranging channel. In this case, the opportunity index indicating a dynamic ranging channel (e.g., dynamic NS-RCH) should be determined to have another value. For example, when the opportunity index indicating the M2M device dedicated ranging code or ranging channel is determined as '0b01', the dynamic ranging channel should be set to '0b10'.

The M2M device transmits the AAI-RNG-REQ message to the base station through the allocated uplink resource (S450) and may receive downlink resource allocation information, through which the AAI-RNG-RSP message is to be transmitted, from the base station (S460) and may also receive the AAI-RNG-RSP message from the base station (S470).

Additionally, before describing the detailed method proposed in the present invention, an identifier for that is used for identifying (or differentiating) the conventional user equipments within the wireless communication system will be briefly described. Herein, an example of a 3GPP LTE system will be given in order to describe the procedures performed by the base station for sending out a PDCCH to the user equipment via downlink.

The base station decides a PDCCH format in accordance with DCI (Downlink Control Information) that is to be transmitted to the user equipment, and then the base station adds a CRC (Cyclic Redundancy Check) to the control information. A Unique identifier (hereinafter referred to as a Radio Network Temporary Identifier (RNTI)) is masked to the CRC in accordance with the owner or purpose of the PDCCH. Meanwhile, in the IEEE 802.16m system, the term STID (Station IDentifier) is used as the concept corresponding to the RNTI of the 3GPP.

In case of the PDCCH for a specific user equipment, a unique identifier of the user equipment, e.g., C-RNTI (Cell-RNTI) may be masked to the CRC. Alternatively, in case of the PDCCH for a paging message, a paging indicating identifier, e.g., P-RNTI (Paging-RNTI) may be masked to the CRC. In case of the PDCCH for system information, an SI-RNTI (System information-RNTI), which corresponds to a system information identifier, may be masked to the CRC. In order to indicate a random access response, which corresponds to a response to a random access preamble being transmitted from the user equipment, a RA-RNTI (Random Access-RNTI) may be masked to the CRC. Table 4 shown below represents examples of identifiers being masked to the PDCCH.

TABLE 4

| Type | Identifier | Description |
| --- | --- | --- |
| UE-specific | C-RNTI | used for the UE corresponding to the C-RNTI. |
| Common | P-RNTI | used for paging message. |
|  | SI-RNTI | used for system information (It could be differentiated according to the type of system information). |
|  | RA-RNTI | used for random access response (It could be differentiated according to subframe or PRACH slot index for UE PRACH transmission). |
|  | TPC-RNTI | used for uplink transmit power control command (It could be differentiated according to the index of UE TPC group). |

When the C-RNTI is used, the PDCCH carries control information for each corresponding specific user equipment, and, when another RNTI is used, the PDCCH carries common control information being received by all or multiple user equipments within each cell. The base station performs channel coding on a DCI having the CRC added thereto, so as to generate coded data. And, the base station performs rate matching (rate mathching) in accordance with the number of CCEs, which are allocated to the PDCCH format. Thereafter, the base station modulates the coded data, so as to generate modulation symbols. Then, the base station maps the modulation symbols to a physical resource element. As described above, the base station uses the RNTI as the user equipment identifier in the LTE system, and the base station uses the STID as the user equipment identifier in the IEEE 802.16 system.

Hereinafter, a paging procedure in the idle mode will be described in detail with reference to FIG. 8.

In order to save the power of the user equipment, an idle mode refers to an operation mode operating a Paging Group, a Paging Cycle, and a Paging Offset, which are authorized by the base station, through signaling between the user equipment and the base station. Additionally, the idle mode corresponds to a mechanism allowing the user equipment to periodically receive a downlink message without being registered to a specific base station, even when the user equipment wanders around a vast range within a wireless (or radio) link environment including multiple base stations.

The Idle mode corresponds to a state when all normal operations including handover (HO) are stopped, and when only the downlink synchronization is matched so that a paging message, which corresponds to a broadcast message, can be received during a predetermined section. The paging message corresponds to a message indicating a paging action to the user equipment. For example, paging operations include performing ranging, network reentry, and so on.

The Idle Mode may be initiated by the user equipment, or may be initiated by the base station. More specifically, by transmitting a deregistration request (DREG-REQ) message to the base station, and by receiving a deregistration response (DREG-RSP) message from the base station as a response to the DREG-REQ message, the user equipment may enter the idle mode. Additionally, by transmitting a non-request deregistration response (DREG-RSP) message or a deregistration command (DREG-CMD) message to the user equipment, the base station may enter the idle mode.

In the idle mode, in case the user equipment receives a respective paging message during an Available Interval (AI), the user equipment may shift to a connected mode with the base station through a network entry procedure, thereby being capable of transmitting and receiving (or transceiving) data.

Generally, when a user equipment moves in a wireless link environment, which is configured of multiple base stations, the Idle State or Idle Mode refers to an operation mode of a user equipment that can enable the user equipment to periodically perform downlink broadcast traffic transmission (or transport) even if the corresponding user equipment is not registered to a specific base station. In case the user equipment does not receive any traffic from the base station for a predetermined period of time, the operation mode of the user equipment may be shifted to the idle mode for the purpose of Power saving. The user equipment being shifted to the idle mode may receive a broadcast message (e.g., paging message) being broadcasted from the base station during an available interval (AI), so as to determine whether the user equipment should shift its operation mode to a normal mode or remain operating in the idle mode.

By removing handover-related activation requests and general management requests, the idle mode may provide the user equipment with benefits. By limiting the user equipment activities to performing scanning in a discrete cycle period, the idle mode may allow the user equipment to save the power and management resources used by the user equipment. Furthermore, by providing provides a simple and adequate method for notifying the user equipment of any pending downlink traffic, and by removing any wireless (or radio) interface and network Hand Over (HO) traffic from a non-active (or inactive) user equipment, the idle mode may provide the network and base station with benefits.

Herein, paging refers to a function of determining the position (or location) (e.g., which base station or which switch (or exchange) station) of a corresponding user equipment, when an incoming call occurs in a mobile communication. Multiple BSs (Base Stations) supporting the Idle state or Idle Mode may belong to a specific Paging Group, so as to configure a paging region (or area or section). At this point, a paging group represents a logical group. When a traffic targeting a user equipment exists, the purpose of the paging group is to provide a close-range area (or region or section) that can be paged via downlink. It is preferable that the paging group is configured to satisfy the conditions of being large enough to allow a specific user equipment to exist within the same paging group during most of the time and being small enough to maintaining an adequate level of paging load (or duty).

The paging group may include at least one or more base stations, and one base station may be included in one or more paging groups. The paging group is defined in the management system. The paging group may use a paging group-action backbone network message. Additionally, the paging controller may use a paging-announce message, which corresponds to one of the backbone network messages, so as to manage a list of idle mode user equipments, and to manage initial paging of all base stations belonging to the paging group.

For simplicity in the description of the present invention, the paging process in the idle mode will be described based upon IEEE 802.16 system. However, the technical spirit and scope of the present invention will not be limited only to the systems presented herein as the standard systems. In order to initiate a shift to the idle mode, the user equipment transmits a Deregistration Request (DREG-REQ) message to the base station, in order to request for a deregistration process from the corresponding base station. Thereafter, as a response to the DREG-REQ message, the base station transmits a Deregistration Response (DREG-RSP) message to the corresponding user equipment. At this point, the DREG-RSP message includes Paging Information. Herein, the initiation of the user equipment for shifting to the idle mode may be disclosed upon request from the base station in an unsoliciated manner. In this case, the base station transmits the DREG-RSP message to the user equipment.

The Paging Information may include values for a Paging Cycle, a Paging Offset, a PGID (Paging Group IDentifier), and a Paging Listening Interval.

After receiving the DREG-RSP message from the base station, the user equipment refers to the paging information, so as to initiate its shift to the idle mode. The idle mode may include a Paging Cycle, and one paging cycle of the idle mode may be configured of an Available Interval and an Unavailable Interval. At this point, the Available Interval may be used as the same concept of a Paging Listening Interval or a paging interval. A paging offset indicates a starting point (e.g., frame or subframe) at which the paging listening interval begins within the paging cycle. Also, a paging group identifier indicates an identifier of a paging group, which is allocated to the user equipment. Moreover, the paging information may include paging message offset information. Herein, the paging message offset information indicates a point at which the paging message is being transmitted from the base station. Thereafter, the user equipment may use the paging information so as to receive a paging message, which is being transmitted to the corresponding user equipment during the available interval, i.e., paging listening interval. Herein, the paging message may be transmitted through the base station or a paging controller. More specifically, the user equipment may monitor a radio channel (or wireless channel) in accordance with the paging cycle in order to receive the paging message.

The idle mode user equipment receives a paging message during its paging listening interval, so as to verify whether or not downlink (DL) data, which are transmitted to the corresponding user equipment, exist. If the downlink data exist (i.e., positive indication), the user equipment performs network reentry procedure including a ranging procedure. Thereafter, by performing a DSA (Dynamic Service Addition) procedure, a process of setting up a connection to a related downlink service flow is performed. After setting up the connection to the related service flow, the base station transmits downlink data respective to the corresponding service to the user equipment.

Hereinafter, for simplicity in the description of the present invention, the idle mode will be described based upon IEEE 802.16e, 16m, and 16p systems. However, the technical spirit and scope of the present invention will not be limited only to the systems presented herein as the standard systems.

In order to enter the idle mode, the user equipment transmits a Deregistration Request (DREG-REQ) message to the base station, in order to request for a deregistration process from the corresponding base station. Thereafter, as a response to the DREG-REQ message, the base station transmits a Deregistration Response (DREG-RSP) message to the corresponding user equipment. At this point, the DREG-RSP message includes Paging Information. Herein, the initiation of the user equipment for shifting to the idle mode may be disclosed upon request from the base station in an unsoliciated manner. In this case, the base station transmits the DREG-RSP message to the user equipment.

The Paging Information may include values for a Paging Cycle, a Paging Offset, a PGID (Paging Group IDentifier), and a Paging Listening Interval. After receiving the DREG-RSP message from the base station, the user equipment refers to the paging information, so as to initiate its shift to the idle mode.

The idle mode may include a Paging Cycle, and one paging cycle of the idle mode may be configured of an Available Interval and an Unavailable Interval. At this point, the Available Interval may be used as the same concept of a Paging Listening Interval or a paging interval. A paging offset indicates a starting point (e.g., frame or subframe) at which the paging listening interval begins within the paging cycle. Also, a paging paging group identifier indicates an identifier of a paging group, which is allocated to the user equipment. Moreover, the paging information may include paging message offset information. Herein, the paging message offset information indicates a point at which the paging message is being transmitted from the base station.

Thereafter, the user equipment may use the paging information so as to receive a paging message, which is being transmitted to the corresponding user equipment during the paging listening interval. Herein, the paging message may be transmitted through the base station or a paging controller. More specifically, the user equipment may monitor a radio channel (or wireless channel) in accordance with the paging cycle in order to receive the paging message.

Figure 8:
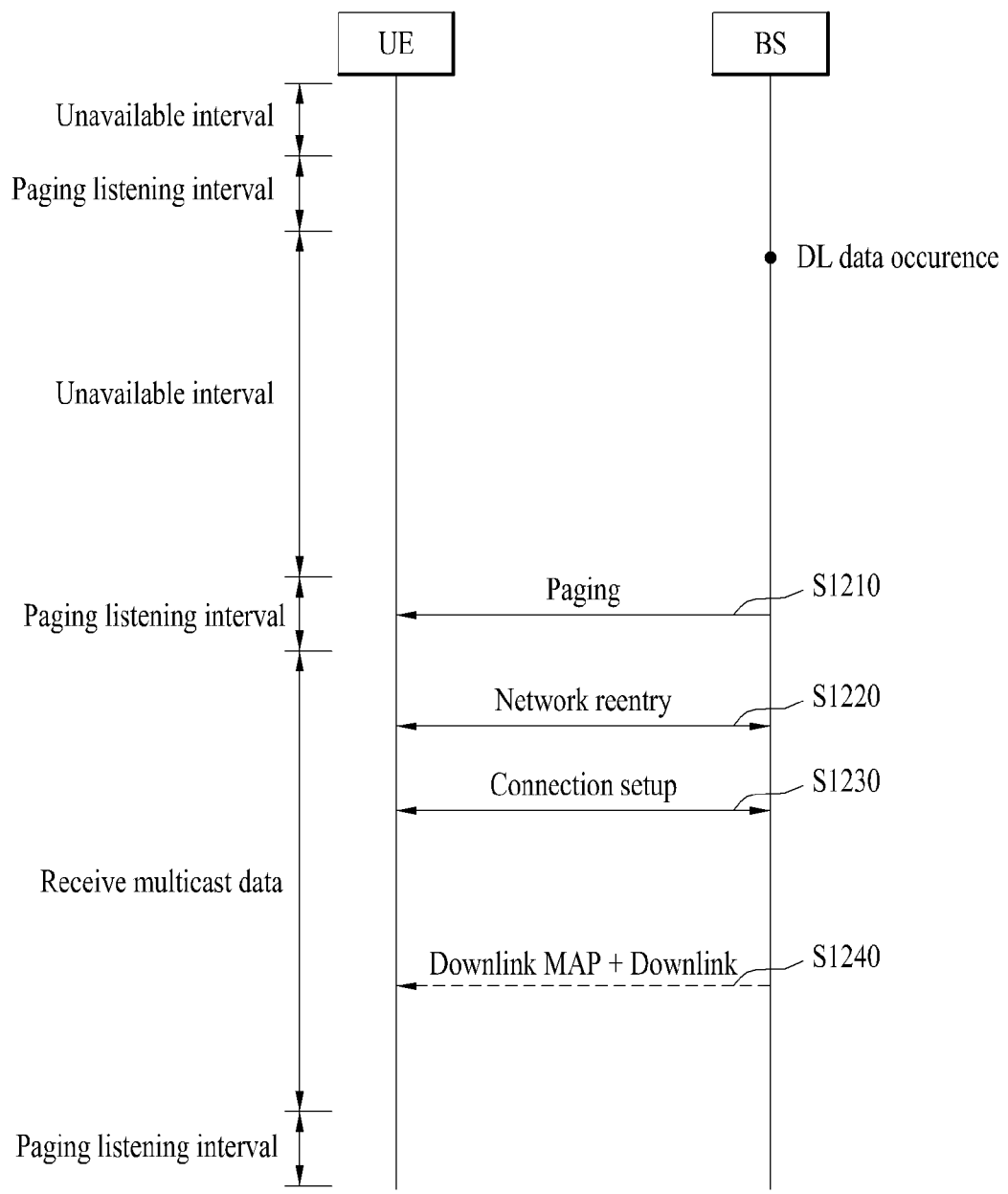
FIG. 8 illustrates a flow chart showing a paging procedure in an idle mode of the M2M device according to an exemplary embodiment of the present invention.

FIG. 8 illustrates a flow chart showing a paging procedure in an idle mode of the M2M device according to an exemplary embodiment of the present invention.

The idle mode user equipment may receive the transmitted paging message during its paging listening interval, so as to verify the presence or absence of downlink (DL) data that are being delivered to the corresponding user equipment (S1210). If it is determined that downlink data exist (i.e., positive indication), the user equipment performs a ranging process including a network reentry process (S1220). Thereafter, by performing a DSA (dynamic service addition) process, the user equipment performs a Connection Setup process, which determines (or sets-up) a connection to a downlink service flow, which is related to the base station (S1230). After the connection to a service flow is determined (or set-up), the base station transmits downlink control information and downlink data respective to the corresponding service to the user equipment (S1240).

In a M2M scenario, since most of the M2M devices do not correspond to a terminal that can be carried (or handheld) by a user, such as a general user equipment, e.g., mobile phones, an automatic application or firmware update process for the M2M devices may correspond to a main application within the M2M service scenario. For example, in order to update the firmware of each device, a M2M server may transmit updated information to the M2M devices having the corresponding application. In order to transmit such multicast data, which are required to be commonly transmitted to diverse devices that are being operated in the idle mode, the base station according to the exemplary embodiment of FIG. 8 shall page the corresponding M2M devices through the paging process. The user equipments that have been paged (or that have received the paging message) may initiate transmission of a random access code, so as to perform a network reentry process. Accordingly, by accessing (or being connected to) a network, the corresponding user equipments may receive DL traffic transmitted from the base station.

Meanwhile, a case when multiple M2M devices belonging to the same subscriber become simultaneously awake, through (or by performing) M2M group paging, so as to attempt ranging may be introduced. At this point, when M2M devices belonging to the same Subscriber become awake simultaneously, the likelihood of the same data traffic being transmitted becomes high.

Therefore, with respect to the M2M devices belonging to the same Subscriber, a method of using Group Resource Allocation (GRA) is required. Hereinafter, Group Resource Allocation (GRA) will be referred to as GRA for simplicity in the description of the present invention.

Additionally, each of the M2M devices may use a GRA group identifier (GRA group ID) to which it belongs and an Identifier (ID) allocated to each M2M device within the group, so as to be differentiated from other M2M devices. Therefore, even when the STID, which is applied in the conventional method, is returned, each of the M2M devices belonging to the GRA group may be identified and differentiated from one another, and the same communication may be performed as before. Through this process, the preparation procedure for the communication may be simplified and reduced, thereby realizing efficient communication.

Furthermore, since channel status (or situation) or uplink synchronization in a Fixed user equipment, which has low mobility, is unlikely to change, the network re-entry procedure may be more simplified. This procedure will be described in more detail later on in the description of the present invention.

Additionally, in the present invention, the GRA group configuration is set up in M2M device units, and, for the transmission of data traffic, only one transport connection may be created, and only one service flow may be used.

The details of the present invention will hereinafter be described with reference to FIG. 9.

Figure 9:
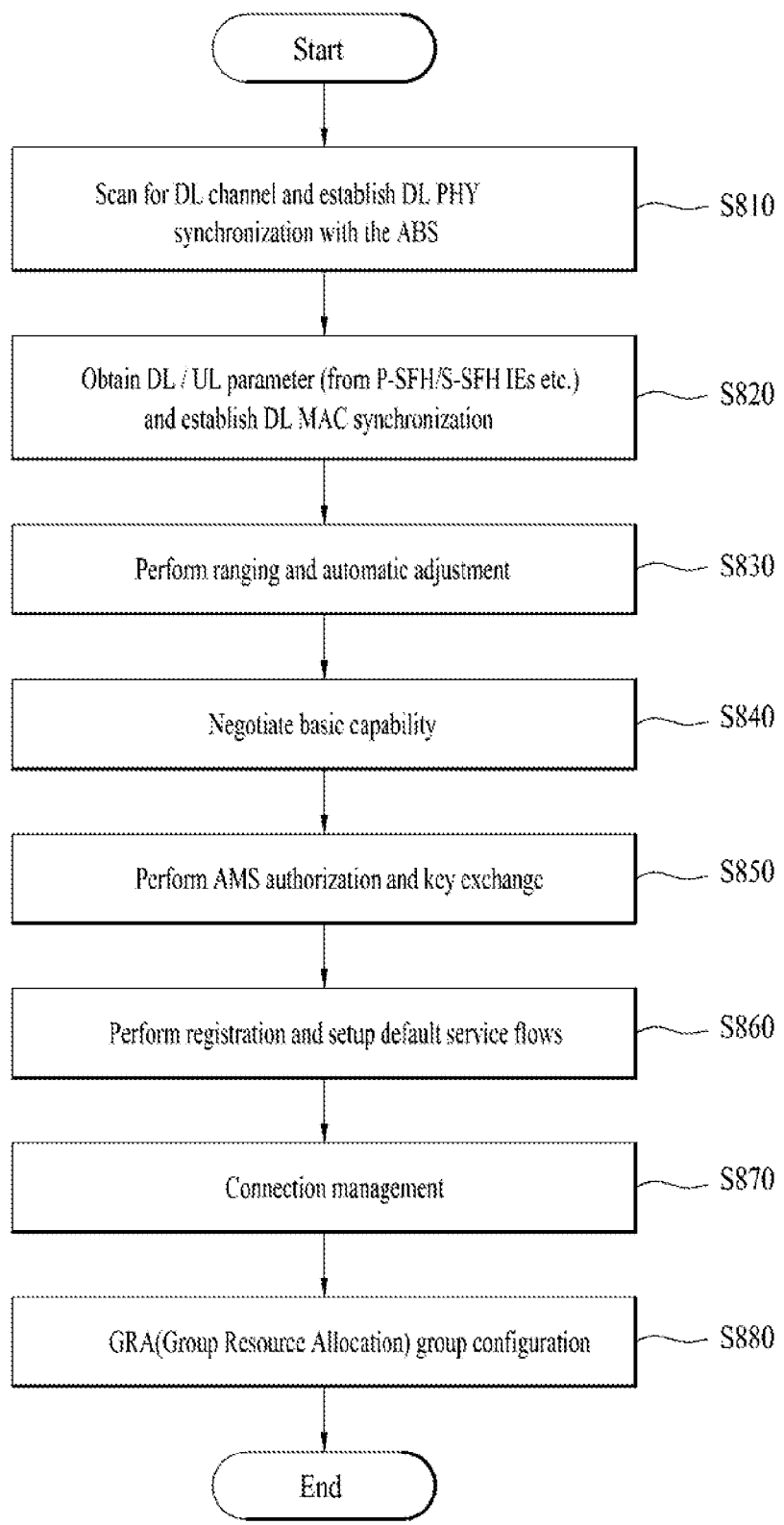
FIG. 9 illustrates an exemplary network entry procedure and an exemplary group resource allocation procedure in the M2M device according to an exemplary embodiment of the present invention.

FIG. 9 illustrates an exemplary network entry procedure and an exemplary group resource allocation procedure in the M2M device according to an exemplary embodiment of the present invention.

In FIG. 9, description will be provided under the assumption that the M2M device corresponds to a Fixed user equipment having low mobility. However, the present invention will not be limited only to the example presented herein, and it will be apparent that the present invention may also be applied to M2M devices having mobility (or mobile M2M devices).

First of all, the M2M device scans a downlink channel and sets up downlink PHY synchronization with the base station (S810).

Subsequently, the M2M device and the base station acquire uplink or downlink parameters (e.g., P-SFH, S-SFH IEs, and so on) and set up downlink MAC synchronization (S820).

Then, the M2M device and the base station may perform ranging and automatic adjustment (S830).

In step S830, after transmitting an Initial ranging code, by receiving an AAI-RNG-ACK or CDMA allocation IE from the base station, the M2M device may match the uplink synchronization (UL sync).

Moreover, the M2M device may include its own MAC address or an AMSID, which corresponds to a varied format of its MAC address, in the resource being included in the CDMA allocation A-MAP and may then transmit the processed resource to the base station.

Thereafter, the M2M device and the base station may go through a negotiation process step for the basic capability (S840).

At this point, the base station may require a method for differentiating each of a fixed M2M device having no mobility, a general M2M device having mobility, and a Human type device from one another.

First of all, as a method for allowing the base station to differentiate the devices, a method for separately defining a Capability Class of the Fixed M2M device may be applied. More specifically, the devices may be differentiated from one another by referring to the pre-determined Capability Class.

Alternatively, when a Fixed M2M device is being installed, since the subscriber may be capable of knowing the MAC address of the M2M device belonging to the corresponding subscriber, a method of notifying the pre-known MAC address to the base station may be used. For example, after verifying the MAC address of the M2M device included in the AAI-RNG-REQ, the base station may be capable of identifying whether or not the device corresponds to a Fixed M2M device.

After step S840, the M2M device may perform authorization and key exchange with the base station (S850).

Subsequently, the M2M device may set up registration and default service flows with the base station (S860).

Additionally, after step S860, the M2M device performs Connection management with the base station (S870).

In step S870, uplink/downlink (UL/DL) transport connection for data transmission is set up. At this point, the applied FID range may be selected from any one of 0100~1111.

Herein, the following methods may be used as a method for setting up transport connection.

First of all a transport connection may be set up by transmitting a DSx message.

Thereafter, in case of a Fixed M2M metering device, since service or application types being provided by the Subscriber are defined in advance, only a single service may be provided. Therefore, in this case, a single transport connection method may be applied.

Also, the transmission of the DSx message for creating the transport connection may be omitted or simplified.

Even when the transmission of the DSx message is omitted, a pre-defined FID may be used as the FID of the transport connection. For example, even with the absence of the DSx message, FID=0100 may be pre-defined and used in a UL unicast transport connection.

Additionally, after step S870, the M2M device and the base station may perform GRA (Group Resource Allocation) group configuration (S880).

More specifically, all user equipments belonging to the GRA group receive a group ID and a User bitmap index or GRA device ID for the identification of each user equipment within the group through an AAI-GRP-CFG.

At this point, when a single application is supported for each M2M device, since only one transport connection exists, the M2M device may perform M2M device unit GRA grouping without having to perform GRA group in flow units. Additionally, in this case, the FID of the M2M device may be omitted from the AAI-GRP-CFG.

Moreover, when the base station seeks to individually identify each M2M device, the base station may identify each device by using the group ID of the GRA and the GRA device ID. However, the base station should be provided in advance with the MAC address of the user equipment and the mapping table of the group ID of the GRA and the GRA device ID.

Meanwhile, according to an exemplary embodiment of the present invention, a Fixed M2M metering device to which the GRA is being applied may perform network reentry through a more simplified procedure. Hereinafter, the exemplary embodiment of the present invention will be described in more detail.

The fixed M2M metering device transmits metering data, which are metered (or measured) under a connected state, to the base station.

Thereafter, the fixed M2M metering device saves power in an idle mode state until a transmission cycle of the next metering data.

Additionally, M2M devices belonging to the same subscriber wake from the idle mode at the same time point through M2M group paging.

When the M2M device receives a CDMA allocation A-MAP after transmitting a ranging code, the M2M device may include its previous MAC address, which was used in the network entry (NW entry) of the AAI-RNG-REQ transmission, or an AMSID, which corresponds to a varied format of the MAC address, to the allocated resource and may then transmit the processed resource to the base station.

At this point, the base station may verify the MAC address of the M2M device and may also verify that the user equipment, which is included in the GRA group, has successfully performed network reentry (NW reentry) in a previous connected state.

Therefore, when performing network reentry (NW reentry) in the Idle state, the user equipment may maintain the GRA group, which was set up during the previous connected state, without modification.

However, the M2M device should remember the group ID and the GRA device ID, which were set up in the previous connected state. Also, the base station cannot allocate the group ID of the M2M device, which has entered the idle mode, to another GRA group.

In order to notify the M2M device that the GRA group is maintained even after the network reentry of the M2M device, the base station may use any one of the following methods.

First of all, the base station may transmit a group ID of the previous connected state to the AAI-RNG-RSP instead the TSTID and may include the STID of each user equipment in each AAI-REG-RSP and then transmit the processed AAI-REG-RSP.

Additionally, when the base station does not allocated the STID to the GRA device, by transmitting a group ID of the previous connected state to the AAI-RNG-RSP instead the TSTID, and by including a group ID of the previous connected state in the AAI-REG-RSP instead of the STID and then transmitting the group ID once again, the base station may notify the M2M device that the GRA group is being maintained even after the network reentry of the M2M device.

Furthermore, the base station may add a separate information field to the AAI-RNG-RSP or AAI-REG-RSP, so as to deliver explicit signaling to the M2M device.

Accordingly, the base station may omit the transmission of the AAI-GRP-CFG and DSx message, and the base station may immediately use the GRA A-MAP, so as to allocate downlink/uplink (DL/UL) resources to the M2M devices.

Meanwhile, when a change in the GRA group is required, any one of the following methods may be used.

In case a M2M device, which is processed with GRA grouping, is changed, the AAI-GRP-CFG may be transmitted only to the user equipment having a status change, such as being excluded from the GRA group or being added to the GRA group.

Hereinafter, a case wherein a change does not occur in the user equipment configuring the GRA group, yet a change occurs in the transmission parameter of the GRA group will be described in detail.

First of all, in this case, a method of transmitting an AAI-GRP-CFG or a separate MAC control message to all user equipment within the GRA group, after a downlink (DL) resource is allocated to the GRA A-MAP, may be used.

Additionally, a method of including changed information in the GRA A-MAP and transmitting the processed GRA A-MAP or a method of transmitting a Multicasting method may also be used.

Meanwhile, according to another exemplary embodiment of the present invention, a Bandwidth request (BR) method of a M2M GRA device will hereinafter be described in detail.

More specifically, after the device of a M2M GRA group discards the STID, a BR may be required for each user equipment.

According to yet another exemplary embodiment of the present invention, when each user equipment attempts a BR, a group ID and a GRA device ID may be used instead of the discarded STID, so as to be differentiated from one another, and the group ID and the GRA device ID may be used to process the BR.

Hereinafter, detailed methods for allowing user equipments to identify one another by using the group ID and the GRA device ID may be used instead of the discarded STID and for processing the BR by using the group ID and the GRA device ID will be described in detail.

First of all, in case of using a Contention based random access BR (Contention based random access bandwidth request), the user equipments may be identified by using the following methods instead of the STID.

More specifically, based upon the fact that the value that can be assigned to the group ID of the convention GRA group, to which individual user equipments belong, is within the range of '000000000000'~'000001111111', in the GRA group ID of the user equipment, which is included in the GRA group discarding the STID, among the 12 bits of the group ID, 7 LSB bits may be set up to use a value within the range of '0000100'~'1111111', and 5 MSB bits may be set up to use a value of '00000'.

At this point, when performing BR, by adding its own device ID to the SMSB bits of the group ID, the added device ID may be used instead of the STID.

Additionally, in order to differentiate the BR of the user equipment, which has discarded the STID, from the BR of individual user equipments including the STID, a BR preamble sequence may be divided into two groups and used accordingly.

Hereinafter, a case of requesting for a BR to a resource, which is allocated to the GRA A-MAP, will be described in detail.

First of all, after performing Group configuration, an amount of resource that is sufficient for transmitting a BR is allocated to the user equipment within the group by using the GRA-A-MAP.

Thereafter, the conventional BR request message may use the GRA device ID instead of the STID, or the GRA device ID may be masked in the group ID and may then be used.

At this point, since only the resource allocated to the group is used, overlapping with another group ID is not required to be taken into consideration.

Hereinafter, a method that can be applied to a case when all devices included in the M2M GRA group transmit the same data size will be described in detail.

When all devices included in the M2M GRA group transmit the same data size, a main user equipment (or device) within the group may request for the BR.

For example, the main user equipment within the group may correspond to a user equipment having the smallest GRA device ID.

If the user equipment has discarded its STID, the main user equipment may use the group ID instead of the STID.

Moreover, in case of using the Contention based random access BR (Contention based random access bandwidth request), in order to differentiate the BR of the user equipment, which has discarded the STID, from the BR of individual user equipments including the STID, a BR preamble sequence may be divided into two groups and used accordingly.

Additionally, the GRA-A-MAP may include information on a common Burst size of the group and information on the resource, which is allocated to best fit the channel status of each user equipment.

Meanwhile, when all devices included in the M2M GRA group transmit data having a pre-defined size, a separate BR is not required, and since the BS is already aware of the data size that is to be transmitted from the user equipment, the base station may transmit only the information on the resource, which is allocated to best fit the channel status for each user equipment, to the GRA-A-MAP.

Figure 10:
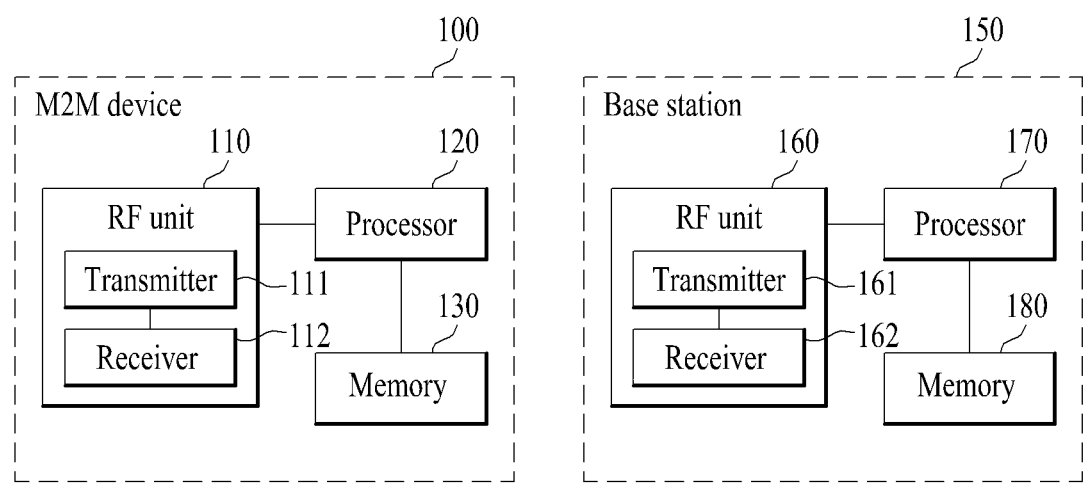
FIG. 10 illustrates user equipment (or device) structures of the M2M device and base station according to an exemplary embodiment of the present invention.

Furthermore, FIG. 10 illustrates user equipment (or device) structures of the M2M device and base station according to an exemplary embodiment of the present invention.

Referring to FIG. 10, a M2M device (100) (also referred to as a M2M communication device, and hereinafter referred M2M device) and a base station (150) may each include a radio frequency (RF) unit (110, 160), a processor (120, 170), and may selectively (or optionally) include a memory (130, 180). Additionally, each RF unit (110, 160) may respectively include a transmitter (111, 161), and a receiver (112, 162). For example, the transmitter (111) and the receiver (112) of the M2M device (100) may be configured to transmit and receive signals to and from the base station (150) and other M2M devices. And, the processor (120) may be functionally connected to the transmitter (111) and the receiver (112), so as to be capable of controlling the process performed by the transmitter (111) and the receiver (112) for transmitting and receiving signals to and from other devices. Additionally, the processor (120) may first perform diverse processes on the signal that is to be transmitted and, then, transmit the processed signal to the transmitter, and the processor (120) may also perform processes on the signal that is received by the receiver (112). When required, the processor (120) may store information included in an exchanged message in the memory (130). And, by being configured of the above-described structure, the M2M device (100) may perform the method according to diverse exemplary embodiments of the present invention, which will hereinafter be described in detail. Meanwhile, although it is not shown in FIG. 10, the M2M device (100) may include diverse additional configurations depending upon the respective device application type. When the corresponding M2M device (100) is designated to perform smart metering, the corresponding M2M device (100) may include an additional configuration for performing power measurement. And, such power measuring operation may be controlled by the processor (120) shown in FIG. 10, and such power measuring operation may also be controlled by a separately configured processor (not shown).

Although FIG. 10 shows an example of a case when communication is performed between the M2M device (100) and the base station (150), the M2M communication method according to the present invention may also be performed between one or more M2M devices. And, being configured to have the same device configuration as the example shown in FIG. 10, each device may perform the method according to diverse exemplary embodiments of the present invention, which will hereinafter be described in detail.

The transmitter (161) and the receiver (162) of the base station (150) may be configured to transmit and receive signals to and from another base station, M2M server, and M2M devices. And, the processor (170) may be functionally connected to the transmitter (161) and the receiver (162), so as to be capable of controlling the process performed by the transmitter (161) and the receiver (162) for transmitting and receiving signals to and from other devices. Additionally, the processor (170) may first perform diverse processes on the signal that is to be transmitted and, then, transmit the processed signal to the transmitter, and the processor (170) may also perform processes on the signal that is received by the receiver (162). When required, the processor (170) may store information included in an exchanged message in the memory (130). And, by being configured of the above-described structure, the base station (150) may perform the method according to diverse exemplary embodiments of the present invention, which will hereinafter be described in detail.

The processor (120, 170) of each of the M2M device (110) and the base station (150) may direct the operations (e.g., control, adjustment, management, and so on) of each of the M2M device (110) and the base station (150). Each of the processors (120, 170) may be connected to the respective memory (130, 180) storing program codes and data. Each memory (130, 180) may be connected to the respective processor (120, 170), so as to store operating systems, applications, and general files.

The processor (120, 170) of the present invention may also be referred to as a controller, a microcontroller, a microprocessor, a microcomputer, and so on. Meanwhile, the processor (120, 170) may be implemented in the form of hardware or firmware, or software, or in a combination of hardware or firmware, and software. In case of implementing the embodiments of the present invention in the form of hardware, the processor (120, 170) may be equipped with ASICs (application specific integrated circuits) or DSPs (digital signal processors), DSPDs (digital signal processing devices), PLDs (programmable logic devices), FPGAs (field programmable gate arrays), and so on, which are configured to perform the present invention.

Meanwhile, in case of implementing the embodiments of the present invention in the form of firmware or software, the firmware or software may be configured to include a module, procedure, or function, which performs the above-described functions or operations of the present invention. And, the firmware or software, which is configured to perform the present invention may be provided in the processor (120, 170) or may be stored in the memory (130, 180), so as to be operated by the processor (120, 170).

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

It will be apparent to anyone skilled in the art that the present invention can be realized in another concrete configuration (or formation) without deviating from the scope and spirit of the characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents.

INDUSTRIAL APPLICABILITY

The method of the M2M device for performing network re-entry may be used is diverse wireless communication systems, such as 3GPP LTE-A, IEEE 802, and so on.

What is claimed is:

1. A method for allocating resources at a Machine to Machine (M2M) device in a wireless communication system, the method comprises:
   receiving, by the M2M device from a base station, first information uniquely identifying the M2M device in the wireless communication system;
   receiving, by the M2M device from the base station, a message including second information and third information, the second information identifying a specific group to which the M2M device belongs, and the third information indicating the M2M device within the specific group;
   transmitting, by the M2M device to the base station, a bandwidth request (BR) when the third information of the M2M device has a smallest value within the specific group,
   wherein, when the M2M device is configured to discard the first information, the bandwidth request includes the second information masked with the third information;
   receiving, by the M2M device, group resource allocation information corresponding to the second information without using the first information; and
   transmitting, by the M2M device, a first signal by using the group resource allocation information based on control information within the group resource allocation information, the control information corresponding to the third information.

2. The method of claim 1, wherein the first information corresponds to a Station Identifier (STID), the second information corresponds to a group ID, and the third information corresponds to a user bitmap index.

3. The method of claim 1, wherein the M2M device corresponds to a fixed device having no mobility.

4. The method of claim 1, further comprising:
entering, by the M2M device, an idle mode after transmitting the first signal; and
when a paging group message is received from the base station, transmitting, by the M2M device, a Medium Access Control (MAC) address used in a previous network entry to the base station.

5. The method of claim 4, further comprising:
transmitting, by the M2M device, a second signal to the base station by using the group resource allocation information.

6. A method for allocating resources at a base station in a wireless communication system, the method comprises:
transmitting, by the base station to a Machine to Machine (M2M) device, first information uniquely identifying the M2M device in the wireless communication system;
transmitting, by the base station to the M2M device, a message including second information and third information, the second information identifying a specific group to which the M2M device belongs, and the third information indicating the M2M device within the specific group;
receiving, by the base station from the M2M device, a bandwidth request (BR) when the third information of the M2M device has a smallest value within the specific group,
wherein, when the M2M device is configured to discard the first information, the bandwidth request includes the second information masked with the third information; and
transmitting, by the base station, group resource allocation information corresponding to the second information without using the first information,
wherein the M2M device is allocated with resources by using the group resource allocation information based on control information within the group resource allocation information, the control information corresponding to the third information.

7. The method of claim 6, wherein the first information corresponds to a Station Identifier (STID), the second information corresponds to a group ID, and the third information corresponds to a user bitmap index.

8. The method of claim 6, further comprising:
transmitting, by the base station, a paging group message to the M2M device;
receiving, by the base station, a Medium Access Control (MAC) address used in a previous network entry from the M2M device; and
determining, by the base station, whether or not the M2M device belongs to the specific group based on the received MAC address.

9. The method of claim 8:
wherein, when the M2M device belongs to the specific group, the second information is transmitted to the M2M device.

10. A Machine to Machine (M2M) device being allocated with resources in a wireless communication system, the M2M device comprises:
a transceiver; and
a processor operatively connected to the transceiver and configured to:
receive, from a base station, first information uniquely identifying the M2M device in the wireless communication system;
receive, from the base station, a message including second information and third information, the second information identifying a specific group to which the M2M device belongs, and the third information indicating the M2M device within the specific group;
transmit, to the base station, a bandwidth request (BR) when the third information of the M2M device has a smallest value within the specific group,
wherein, when the M2M device is configured to discard the first information, the bandwidth request includes the second information masked with the third information;
receive group resource allocation information corresponding to the second information without using the first information; and
transmit a first signal by using the group resource allocation information based on control information within the group resource allocation information, the control information corresponding to the third information.

11. The M2M device of claim 10, wherein the first information corresponds to a Station Identifier (STID), the second information corresponds to a group ID, and the third information corresponds to a user bitmap index.

12. The M2M device of claim 10, wherein the M2M device corresponds to a fixed device having no mobility.

13. The M2M device of claim 10, wherein the processor is further configured to
enter an idle mode when the first signal is transmitted, and
when a paging group message is received from the base station, transmit a Medium Access Control (MAC) address used in a previous network entry to the base station.

14. The M2M device of claim 13, wherein, when the receiving module receives the second information from the base station, the processor is further configured to transmit a second signal to the base station by using the group resource allocation information.

15. A base station allocating resources in a wireless communication system, the base station comprises:
a transceiver; and
a processor operatively connected to the transceiver and configured to:
transmit, to a Machine to Machine (M2M) device, first information uniquely identifying the M2M device in the wireless communication system;
transmit, to the M2M device, a message including second information and third information, the second information identifying a specific group to which the M2M device belongs, and the third information indicating the M2M device within the specific group;
receive, from the M2M device, a bandwidth request (BR) when the third information of the M2M device has a smallest value within the specific group,
wherein, when the M2M device is configured to discard the first information, the bandwidth request includes the second information masked with the third information; and
transmit group resource allocation information corresponding to the second information without using the first information,
wherein the M2M device is allocated with resources by using the group resource allocation information based on control information within the group resource allocation information, the control information corresponding to the third information.

16. The base station of claim 15, wherein the first information corresponds to a Station Identifier (STID), the second information corresponds to a group ID, and the third information corresponds to a user bitmap index.

17. The base station of claim 15, wherein the processor is further configured to:
  transmit a paging group message to the M2M device;
  receive a Medium Access Control (MAC) address used in a previous network entry from the M2M device; and
  determine whether or not the M2M device belongs to the specific group based on the received MAC address.

18. The base station of claim 17, wherein, when the M2M device belongs to the specific group, the second information is transmitted to the M2M device.

* * * * *